US009549364B2

(12) United States Patent
Boldyrev et al.

(10) Patent No.: US 9,549,364 B2
(45) Date of Patent: *Jan. 17, 2017

(54) METHOD AND APPARATUS FOR PROVIDING OPTIMIZED PRIVACY IN COGNITIVE RADIO INFORMATION SHARING

(71) Applicant: Nokia Technologies OY, Espoo (FI)

(72) Inventors: Sergey Boldyrev, Söderkulla (FI); Jari-Jukka Harald Kaaja, Järvenpää (FI); Ian Justin Oliver, Söderkulla (FI); Mikko Aleksi Uusitalo, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 160 days.

This patent is subject to a terminal disclaimer.

(21) Appl. No.: 14/304,618

(22) Filed: Jun. 13, 2014

(65) Prior Publication Data

US 2014/0293928 A1    Oct. 2, 2014

Related U.S. Application Data

(63) Continuation of application No. 13/169,634, filed on Jun. 27, 2011, now Pat. No. 8,843,127.

(51) Int. Cl.
*H04W 40/24* (2009.01)
*H04W 12/02* (2009.01)
(Continued)

(52) U.S. Cl.
CPC ........... *H04W 40/248* (2013.01); *H04W 12/02* (2013.01); *H04W 16/14* (2013.01); *H04L 63/105* (2013.01); *H04L 63/20* (2013.01)

(58) Field of Classification Search
CPC ..................................................... H04W 12/02
See application file for complete search history.

(56) References Cited

U.S. PATENT DOCUMENTS 8,194,700 B2    6/2012 Grandblaise et al.
8,477,642 B2    7/2013 Nagaraja
(Continued)

FOREIGN PATENT DOCUMENTS

WO         2008039872 A2    4/2008

OTHER PUBLICATIONS

Akyildiz et al., "Cooperative Spectrum Sensing in Cognitive Radio Networks: A Survey", Physical Communication, 2010, 23 pages.
(Continued)

*Primary Examiner* — Hassan Kizou
*Assistant Examiner* — Abdullahi Ahmed
(74) *Attorney, Agent, or Firm* — Ditthavong & Steiner, P.C.

(57) ABSTRACT

An approach is provided for providing optimized privacy in cognitive radio information sharing. A cognitive radio privacy optimization platform determines cognitive radio connectivity information provided by at least one device. The cognitive radio privacy optimization platform also processes and/or facilitates a processing of the cognitive radio connectivity information to determine a quality, an amount, or a combination thereof of the cognitive radio connectivity information. The cognitive radio privacy optimization platform further determines at least one service class for providing cognitive radio connectivity to the at least one device based, at least in part, on the quality, the amount, or a combination thereof of the cognitive radio information.

18 Claims, 14 Drawing Sheets

(51) Int. Cl.
*H04W 16/14* (2009.01)
*H04L 29/06* (2006.01)

(56) References Cited

U.S. PATENT DOCUMENTS

| | | | | |
|---|---|---|---|---|
| 8,843,127 | B2* | 9/2014 | Boldyrev | H04W 40/248 455/425 |
| 2003/0236890 | A1 | 12/2003 | Hurwitz et al. | |
| 2008/0192686 | A1* | 8/2008 | Cho | H04W 16/14 370/329 |
| 2009/0124208 | A1 | 5/2009 | Mody et al. | |
| 2010/0069013 | A1 | 3/2010 | Chaudhri et al. | |
| 2010/0238798 | A1 | 9/2010 | Ahuja et al. | |
| 2010/0250722 | A1 | 9/2010 | Palin et al. | |
| 2010/0306278 | A1 | 12/2010 | Oliver et al. | |
| 2011/0138183 | A1 | 6/2011 | Reddy et al. | |
| 2011/0319114 | A1 | 12/2011 | Tavildar et al. | |
| 2012/0122448 | A1 | 5/2012 | Mueck et al. | |
| 2012/0165056 | A1 | 6/2012 | Kim et al. | |
| 2012/0166645 | A1* | 6/2012 | Boldyrev | G06F 9/5083 709/226 |
| 2012/0230250 | A1 | 9/2012 | Kasslin et al. | |
| 2012/0311657 | A1* | 12/2012 | Boldyrev | H04W 12/02 726/1 |
| 2012/0329384 | A1* | 12/2012 | Boldyrev | H04W 40/248 455/39 |

OTHER PUBLICATIONS

Brown et al., "Potential Cognitive Radio Denial-of-Service Vulnerabilities and Protection Countermeasures: A Multi-dimensional Analysis and Assessment", 2008, 8 pages.
Ersoz et al., "Secure Spectrum Sensing and Decision in Cognitive Radio Networks", Communications in Computer and Information Science vol. 84, 2010, pp. 99-111.
Kim, "Location-based Authentication Protocol for First Cognitive Radio Networking Standard", Journal of Network and Computer Applications, vol. 34, 2010, pp. 1160-1167.
Office Action for related U.S. Appl. No. 13/075,723, dated Dec. 20, 2012, 12 pages.
Office Action for related U.S. Appl. No. 13/149,362, dated Jan. 16, 2013, 98 pages.
International Search Report for PCT/FI2012/050534, dated Sep. 25, 2012, 5 pages.
Burbank, "Security in Cognitive Radio Networks: The Required Evolution in Approaches to Wireless Network Security", 3rd International Conference on Cognitive Radio Oriented Wireless Networks and Communications, May 15-17, 2008, IEEE 2008, 8 pages.
Xie et al., "Cognitive Radio Resource Management Using Multi-Agent Systems", 4th IEEE Consumer Communications and Networking Conference (CCNC 2007), Jan. 11-13, 2007, IEEE 2007, pp. 1123-1127.
Ajam et al., "Privacy Enforcement of Composed Services in Cellular Networks", 11th Annual International Conference on New Technologies of Distributed Systems (NOTERE), May 9-13, 2011, IEEE 2011, 2 pages.
Lou et al., "Security, Privacy, and Accountability in Wireless Access Networks", IEEE Wireless Communications, 2009, vol. 16, No. 4, IEEE 2009, 2 pages.
Written Opinion for PCT/FI2012/050534, dated Sep. 25, 2012, 8 pages.
Office Action for related U.S. Appl. No. 13/075,723, dated Jul. 26, 2012, 13 pages.
Extended European Search Report, Application No. 12161740.1-2412, dated Jun. 25, 2012, 18 pages.
Harada, "Cognitive Wireless Cloud: A Network Concept to Handle Heterogeneous and Spectrum Sharing Type Radio Access Networks", National Institute of Information and Communications Technologies, Japan, Sep. 2009, 2 pages.
Junell et al., "System Description and Reference Model Proposal", IEEE P802.19-10/0110r0, Sep. 5, 2009, 23 pages.
Kasslin, "System Design Document", Mar. 18, 2010, IEEE 802.19-10/0055r02, 12 pages.
Kwak et al., "System Description and Reference Model Proposal", IEEE P802.19.1, Sep. 15, 2010, 21 pages.
Pajarinen et al., "Efficient Panning in Large POMDPs through Policy Graph Based Factorized Approximations", Machine Learning and Knowledge Discovery in Databases Lecture Notes in Computer Science, vol. 6323 (2010), 4 pages.
Pajarinen et al., "Latent State Models of Primary User Behavior for Opportunistic Spectrum Access", 2009 IEEE, Finland, 2 pages.
"WURFL", Wikipedia, retrieved from web page, http://en.wikipedia.org/w/index.php?title=WURFL&oldid=472996850, dated Oct. 8, 2014, 6 pages.

\* cited by examiner

METHOD AND APPARATUS FOR PROVIDING OPTIMIZED PRIVACY IN COGNITIVE RADIO INFORMATION SHARING

RELATED APPLICATIONS

This application is a continuation of U.S. patent application Ser. No. 13/169,634, filed Jun. 27, 2011, the contents of which are incorporated herein by reference in their entirety.

BACKGROUND

Mobile devices with various methods of connectivity are now for many people becoming the primary gateway to the internet and also a major storage point for personal information. This is in addition to the normal range of personal computers and furthermore sensor devices plus internet based providers. Combining these devices together and lately the applications and the information stored by those applications is a major challenge of interoperability. This can be achieved through numerous, individual and personal information spaces in which persons, groups of persons, etc. can place, share, interact and manipulate (or program devices to automatically perform the planning, interaction and manipulation of) webs of information with their own locally agreed semantics without necessarily conforming to an unobtainable, global whole.

Furthermore, in addition to information, the information spaces may be combined with webs of shared and interactive computations or computation spaces so that the devices having connectivity to the computation spaces can have the information in the information space manipulated within the computation space environment and the results delivered to the device, rather than the whole process being performed locally in the device. It is noted that such computation spaces may consist of connectivity between devices, from devices to network infrastructure, to distributed information spaces so that computations can be executed where enough computational elements are available. These combined information spaces and computation spaces often referred to as computation clouds, are extensions of the 'Giant Global Graph' in which one can apply semantics and reasoning at a local level.

Networks composed of mobile and immobile devices associated with the wide spectrum of distributed information and computation spaces communicate with each other via methods of connectivity based on various paradigms of communication (or radio) such as, for example, cognitive radio wave, telephony, fiber optics, orbiting satellites, the Internet, etc. A recent development in radio communication technology referred to as "cognitive radio" provides a paradigm for wireless communication in which either a network or a wireless node changes its transmission or reception parameters to communicate efficiently while avoiding interference with other users, either licensed or unlicensed. In one embodiment, this alteration of parameters is based, at least in part, on the active monitoring of several factors in the external and internal radio environment, such as radio frequency spectrum, user behavior and network state. By way of example, cognitive radio can provide many advantages over traditional radio communication paradigms, for example, by (1) enabling use of all available frequencies leading to efficient use of the radio spectrum, (2) providing each user with the optimal connectivity for the use and the occasion, (3) providing easy access control and identification management, (4) providing new levels of interaction among various radio types, etc. Because of the benefits of cognitive radio, many network managers may opt for using cognitive radio as their preferred way of communication. In order to be able to benefit from the advantages of cognitive radio, the users may need to share information about themselves with radio management systems so that the management systems can match user needs with available connectivity. However, on one hand, the users may be reluctant to reveal detailed information about themselves in exchange of services, while, on the other hand, the more information cognitive radio management systems have on the users, the better they can serve users' needs. Therefore, a balance between the privacy level and provided services should be achieved.

Some Example Embodiments

Therefore, there is a need for an approach for providing optimized privacy in cognitive radio information sharing.

According to one embodiment, a method comprises determining cognitive radio connectivity information provided by at least one device. The method also comprises processing and/or facilitating a processing of the cognitive radio connectivity information to determine a quality, an amount, or a combination thereof of the cognitive radio connectivity information. The method further comprises determining at least one service class for providing cognitive radio connectivity to the at least one device based, at least in part, on the quality, the amount, or a combination thereof of the cognitive radio information.

According to another embodiment, an apparatus comprises at least one processor, and at least one memory including computer program code, the at least one memory and the computer program code configured to, with the at least one processor, cause, at least in part, the apparatus to determine cognitive radio connectivity information provided by at least one device. The apparatus is also caused to process and/or facilitate a processing of the cognitive radio connectivity information to determine a quality, an amount, or a combination thereof of the cognitive radio connectivity information. The apparatus is further caused to determine at least one service class for providing cognitive radio connectivity to the at least one device based, at least in part, on the quality, the amount, or a combination thereof of the cognitive radio information.

According to another embodiment, a computer-readable storage medium carries one or more sequences of one or more instructions which, when executed by one or more processors, cause, at least in part, an apparatus to determine cognitive radio connectivity information provided by at least one device. The apparatus is also caused to process and/or facilitate a processing of the cognitive radio connectivity information to determine a quality, an amount, or a combination thereof of the cognitive radio connectivity information. The apparatus is further caused to determine at least one service class for providing cognitive radio connectivity to the at least one device based, at least in part, on the quality, the amount, or a combination thereof of the cognitive radio information.

According to another embodiment, an apparatus comprises means for determining cognitive radio connectivity information provided by at least one device. The apparatus also comprises means for processing and/or facilitating a processing of the cognitive radio connectivity information to determine a quality, an amount, or a combination thereof of the cognitive radio connectivity information. The apparatus further comprises means for determining at least one service class for providing cognitive radio connectivity to the at least one device based, at least in part, on the quality, the amount, or a combination thereof of the cognitive radio information.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing optimized privacy in cognitive radio information sharing are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
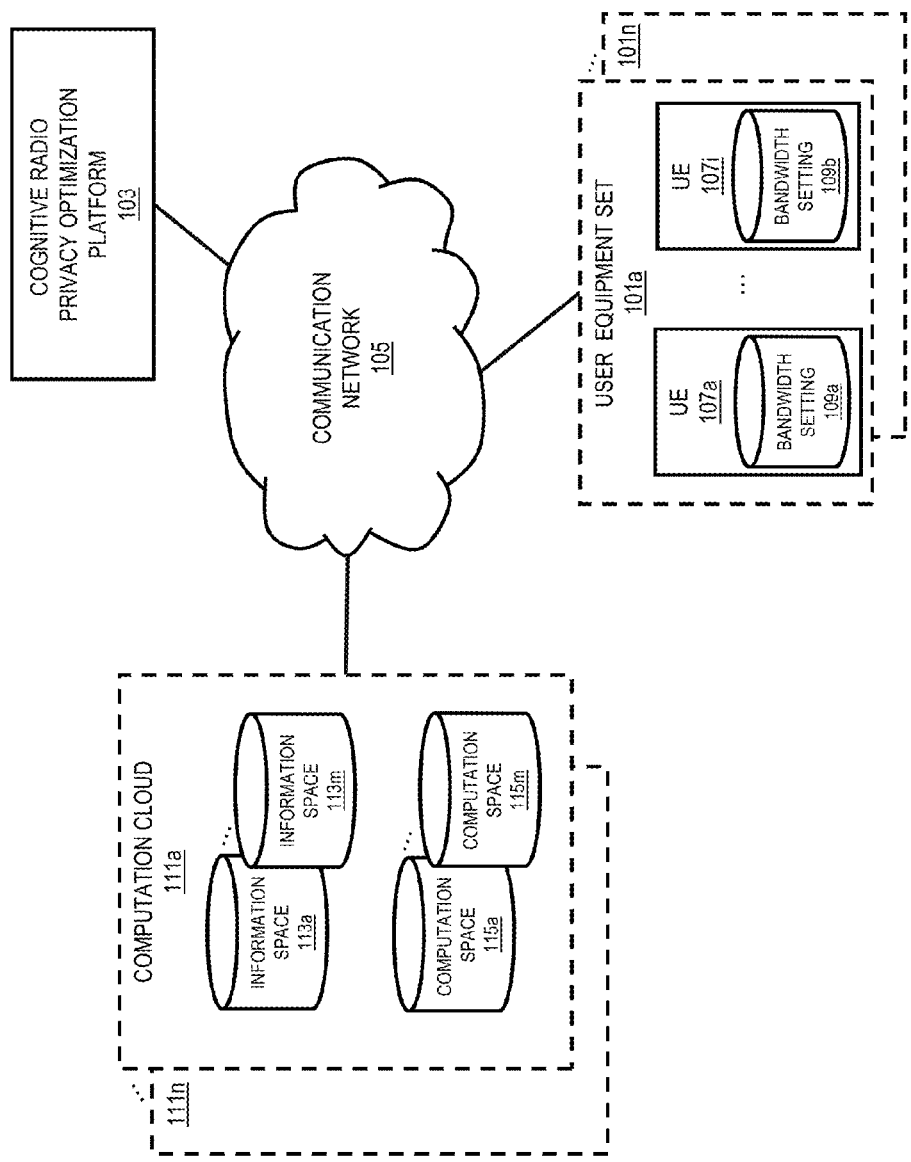
FIG. 1 is a diagram of a system capable of providing optimized privacy in cognitive radio information sharing, according to one embodiment.

FIG. 1 is a diagram of a system capable of providing optimized privacy in cognitive radio information sharing, according to one embodiment. Under traditional radio communication protocols, mobile devices generally are limited to using certain frequencies for communication which may cause high network traffic. For example, new music and video services on the Internet may require far more bandwidth than is available on the networks. As noted above, cognitive radio technology can be used to overcome some of the limitations of traditional wireless communications. For example, cognitive radio enables the devices to use all available frequencies even those dedicated to special services such as, for example, television (TV), satellites, etc. to support communications. More specifically, cognitive radio devices typically determine locally available radio spectrum and then negotiate with each other and/or with network management components in order to use the available radio spectrum in the most efficient way.

In one embodiment, cognitive radio may provide the possibility to multiply the current network speeds and/or capacity. For example, cognitive radio technology can be configured to understand the language of any radio protocol. This characteristic of the cognitive radio, combined with new simple radios embedded in any object, can provide interaction between any physical objects. This can also provide solutions for communication between people using communication devices with different setups, such as for example, different languages and cultures, etc.

For example, at a big event such as a concert or a sports event the local network may get overloaded. Based on the current spectrum usage limitations, the provided capacity may not be enough for all the users. In one embodiment, cognitive radio technology can use all available frequencies and connectivity methods. It can quickly adapt to the unusual situation and ensure proper operation of the networks. The devices can connect not only through the network cells, but also by forming spontaneous networks. This enables many more users to transmit information such as, for example, messages, phone calls, real time video streams, etc.

Furthermore, the cognitive connectivity and radio communication paradigm generally provides and/or relies on location dependent information on available bandwidth, rules, and tuning setups associated with a communication network. Accordingly, a cognitive radio enabled system often is equipped with one or more centralized databases in addition to local coexistence management for every device to interact and request operational parameters. More specifically, cognitive radio enabled devices can request and/or inform their (spectrum) findings to the cognitive radio database and local coexistence management, and in return receive settings and other response information to configure devices and utilize settings correctly at certain locations, which are under certain regulations. These interactions often involve sharing and/or distributing cognitive radio information among participating devices. In addition, a cognitive enabled device should provide information to the coexistence manager in order for the coexistence manager to be able to provide a proper type of available connectivity to the device using the provided information. The coexistence manager may also exchange the information regarding individual devices with other (e.g., global) databases. However, users may be reluctant to reveal private information about them and let that information to be stored in a central cognitive radio database. On the other hand, the more information cognitive connectivity system has about the users, the better it can serve users' needs. Therefore, there is a need for a balance between the amount of shared information and the services provided so that an optimum amount of information about the users is revealed.

To address this problem, a system 100 of FIG. 1 introduces the capability to provide optimized privacy in cognitive radio information sharing. The cloud computing environments provide aggregated sets of information (information spaces) and computations (computation spaces) from different sources. This multi-sourcing is very flexible since it accounts and relies on the observation that the same piece of information or computation can come from different sources. In one embodiment, information and computations within the cloud are represented using Semantic Web standards such as Resource Description Framework (RDF), RDF Schema (RDFS), OWL (Web Ontology Language), FOAF (Friend of a Friend ontology), rule sets in RuleML (Rule Markup Language), etc. Furthermore, as used herein, RDF refers to a family of World Wide Web Consortium (W3C) specifications originally designed as a metadata data model. It has come to be used as a general method for conceptual description or modeling of information and computations that is implemented in web resources; using a variety of syntax formats.

The basic concept of information space technology provides access to distributed information for various devices within the scope of the cloud, in such a way that the distributed nature of the information is hidden from users and it appears to a user as if all the information exist on the same device. The information spaces also enable a user to have control over information distribution by transferring information between devices that the user has access to. For example, a user may want to transfer information among work devices, home devices, and portable devices, other private and public devices, etc. Furthermore, as computing environments become more and more personalized as well as localized, the need for more sophisticated sharing mechanisms between information spaces increases. For example, users may tend to own more than one mobile devices and using them for various purposes such as, a work phone, a personal phone, a media player, a browser, etc. These sharing mechanisms while at the outset appear to be simple union and partitioning of the information proved more difficult because of the internal interactions of the information and the semantic structures governing that information. For example, operations such as split (dividing an information space into two or more smaller information spaces), merge (joining two or more information spaces into larger information spaces), projection (extracting information from an information space), injection (adding information to an existing information space), etc. facilitate sharing information among devices.

In one embodiment, cognitive radio enabled communication networks interact with the information spaces of a cloud environment, create mappings between related architectures, find commonalties in order to determine how cognitive radio can fit into wireless mobile environments (e.g., via platform application programming interfaces (APIs) such as core APIs and/or mobile functionality specific APIs, wherein platform APIs add mobile device features to the standard application development platforms).

In one embodiment, a distributed information space is constituted by different namespaces, wherein a namespace is an abstract environment holding logical groupings of unique identifiers associated with the information space content. In this embodiment, the information associated with cognitive radio (e.g. cognitive radio parameters) may be stored in different namespaces associated with distributed information spaces and the namespaces within the distributed information spaces are accessible to one or more cognitive radio enabled devices so that the cognitive radio enabled devices can use the stored parameters for communication within the wireless environment.

In one embodiment, integrated services and architectures enable the cognitive radio communication networks and other systems such as distributed information spaces and communication spaces in a cloud environment to communicate with each other via a common language. In this way, information spaces or cloud entities can be considered as aggregated information sets from different sources. In one embodiment, this multi-sourcing provides considerable flexibility by enabling the same piece of information to come from different sources.

It is noted that cognitive radio may use any available radio spectrum. For example, in the United States, cognitive radio devices include TV band devices (TVBDs) that can use available TV white space spectrum (or the unused TV spectrum) for communications. To facilitate such use, a cognitive radio database can be created to record uses or applications of the TV white space to ensure that cognitive radio uses do not interfere with other uses of the same radio frequencies (e.g., for TV broadcasts, etc.) In other words, the application of cognitive radio technology to white spaces may provide intelligent combination of the white spaces with other licensed and unlicensed bands to increase total system capacity and reliability. However, since a cognitive radio database may contain sensitive and private information, ensuring the privacy of the database content and prevention of unauthorized access to the information is an important issue. In order to provide efficiency, flexibility and scalability to the users, a cognitive radio system should also provide privacy services and integrate privacy enabler and filtering architectures to offer cognitive connectivity with other existing systems. Additionally, privacy functionality should be integrated into the cognitive radio database, into different places in the cognitive radio TV white space, other local domain systems, Radio Frequency (RF) memory tag systems, or a combination thereof.

In one embodiment, a device can access the cognitive connectivity white space database architecture and other cognitive connectivity information via the distributed information spaces and communication spaces in a cloud environment. Therefore, cloud environment as a communication standard can be also utilized for exchange of cognitive connectivity information among devices.

In one embodiment, the cognitive connectivity and radio provide location dependent information on available bandwidth, rules, and tuning setup. Cognitive radio has access to centralized databases and local coexistence management for every device to interact and request operational parameters. However, certain information may be more sensitive (e.g. with privacy aspects assigned). When exchanging such private information to devices, a privacy enabler functions as a gatekeeper between the information requesting component and other components of the cognitive radio environment and filters the sensitive information. Additionally, privacy databases, accessible via the cloud, may exist which control privacy in environments such as social networks, etc. The privacy control can be done based on requester's ID, credentials and location data, etc.

In one embodiment, the privacy enabler needs to create a balance between the amount of user information revealed to the cognitive connectivity and radio provider such that user privacy is ensured at the same time as acceptable quality of service is provided to the user. The privacy enabler should provide a balanced service quality in terms of connectivity and the level of detail individual users are willing to reveal.

In one embodiment, users are divided into service classes, such as for example classes A, B and C. The users in the highest service class (e.g. class A) may reveal all available information on them as accurately as possible and can receive, in return, highest level of optimized cognitive connectivity. Such revealed information may include location, device used, connectivity subscriptions available (e.g. an operator data plan with a flat rate fee), applications used, etc. In this embodiment, since the cognitive connectivity infrastructure has the maximum information available, it can provide the best connectivity. However in the lowest service class, (e.g. class C) the information revealed can be of lowest quality and as a result the connectivity provided will be of lowest quality.

In one embodiment, a link between the service class of a user and the privacy aspects for the used is generated that indicates, in order to receive a particular quality of service, to what extent information can be shared. The privacy aspects may include the owner of the data, provenance or system of record of the data (e.g., ownership history), the sensitivity of the data, the allowed usages of the data, the agents or entities with access to the data, access control (e.g., access credentials), data retention (e.g., data archival policies and rules), etc.

In one embodiment, service classes are allocated to devices based on capabilities, visibility, and the amount of information revealed by the cognitive radio enabled device. Table 1, shows an example service class allocation.

TABLE 1

| Service Class | Information Revealed | Privacy | Capabilities |
| --- | --- | --- | --- |
| A | Low Limitations | Low | High Accuracy |
| B | Medium Limitations | Medium | Medium accuracy |
| C | High Limitations | High | Low accuracy |

In one embodiment, the capabilities provided to cognitive radio enabled devices at a specific location are determined based on the quality of information that each device is revealing. As seen in Table 1, the less information revealed, more privacy for the devices is provided. In this embodiment, a mechanism is used to balance information, privacy, and other capabilities sets in order to provide optimum allocations for each cognitive radio enabled device.

In one embodiment, a device 107a-107i may belong to one or more groups of devices, wherein a group has certain set of rules and benefits. Devices of a group may reveal less information outside the group (strict rules) than the information they share among group members (less strict rules) in order to receive a certain quality of service in cognitive connectivity. In this embodiment, group information and shared information among group members can be used for providing services with higher quality to the members of the group. A device 107a-107i may have multiple roles specified with regards to different groups the device is a member of and each role may provide a different level of cognitive connectivity to the device, based on the characteristics specific to the group.

In one embodiment, one or more incentive programs can be created, so that users can receive incentives for a certain level of detailed information that they are willing to reveal while using cognitive connectivity. For example, a "loyalty program" can be created based on which the service classes assigned to a device work as stimuli for users to trade the information they own in return for having certain levels of quality of service provided by operator, cognitive connectivity provider, or a combination thereof.

As shown in FIG. 1, the system 100 comprises sets 101a-101n of user equipments (UEs) 107a-107i having connectivity to the cognitive radio privacy optimization platform 103 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 107a-107i are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 107a-107i can support any type of interface to the user (such as "wearable" circuitry, etc.).

In one embodiment, the optimized privacy of the information in a cognitive radio information sharing environment can be provided in an ad-hoc mesh network. An ad-hoc mesh network is, for instance, a serverless device-to-device network (e.g., a mobile ad-hoc network (MANET)) created using short-range radio technology (e.g., wireless local area network (WLAN) or Bluetooth®). Alternatively, ad-hoc mesh networks may be created using close proximity radio technology for very short distances such as Radio Frequency Identification (RFID), Near Field Communication (NFC), RF memory tag systems, etc. A close proximity network can be part of a bigger ad-hoc mesh network, the last centimeter distances from cognitive mobile reader/writer device to the RF memory tag or other peer devices. Within the ad-hoc mesh network, each wireless device 107a-107i may be mobile and is within communication range of any number of other wireless devices 107a-107i. Accordingly, the set of wireless devices 107a-107i that are within communication range of any a particular wireless device 107 is transient and can change as the wireless devices 107a-107i move from location to location.

In one embodiment, policies (e.g. privacy policies) can be presented in a direct way, wherein the user of a user equipment (UE) 107a-107i can have direct control over policies using a User Interface (UI) on the UE 107a-107i (traditional approach). In other embodiments, the policies can be implicitly enforced behind the scene, wherein the UEs can interact implicitly, for example via a contact list.

In one embodiment, the privacy optimization is applied to cognitive radio specific systems architecture (e.g. white space), ad-hoc mesh networks, distributed information architectures (e.g. clouds), etc. The cognitive radio privacy optimization platform 103 can utilize cognitive radio capabilities, which can provide additions to policy languages.

In one embodiment, the cognitive radio privacy optimization data can be integrated with privacy database (e.g. central database) which can control privacy of the cognitive radio database and access privacy to and/or from the database. Alternatively, the privacy optimization data can be distributed with equivalent privacy enabler to cognitive radio white space architecture blocks and to different places in cognitive radio white space such as, for example, TV Band Devices (TVBD), Coexistence Enablers (CE), Coexistence Managers (CM), Coexistence Discovery and Information Servers (CDIS), remote CMs, etc.

In other embodiments, the cognitive radio spectrum and device settings, including privacy settings, can be locally put under selected privacy policies, cloud or ad-hoc mesh network environments can provide privacy enabler interaction means, and the combination of these privacy enforcements can provide agreed upon privacy optimization options for different ranges of local and distributed communications. As a result, a privacy optimization can be integrated into the cognitive radio system.

By way of example, the UEs 107a-107i, and the cognitive radio privacy optimization platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
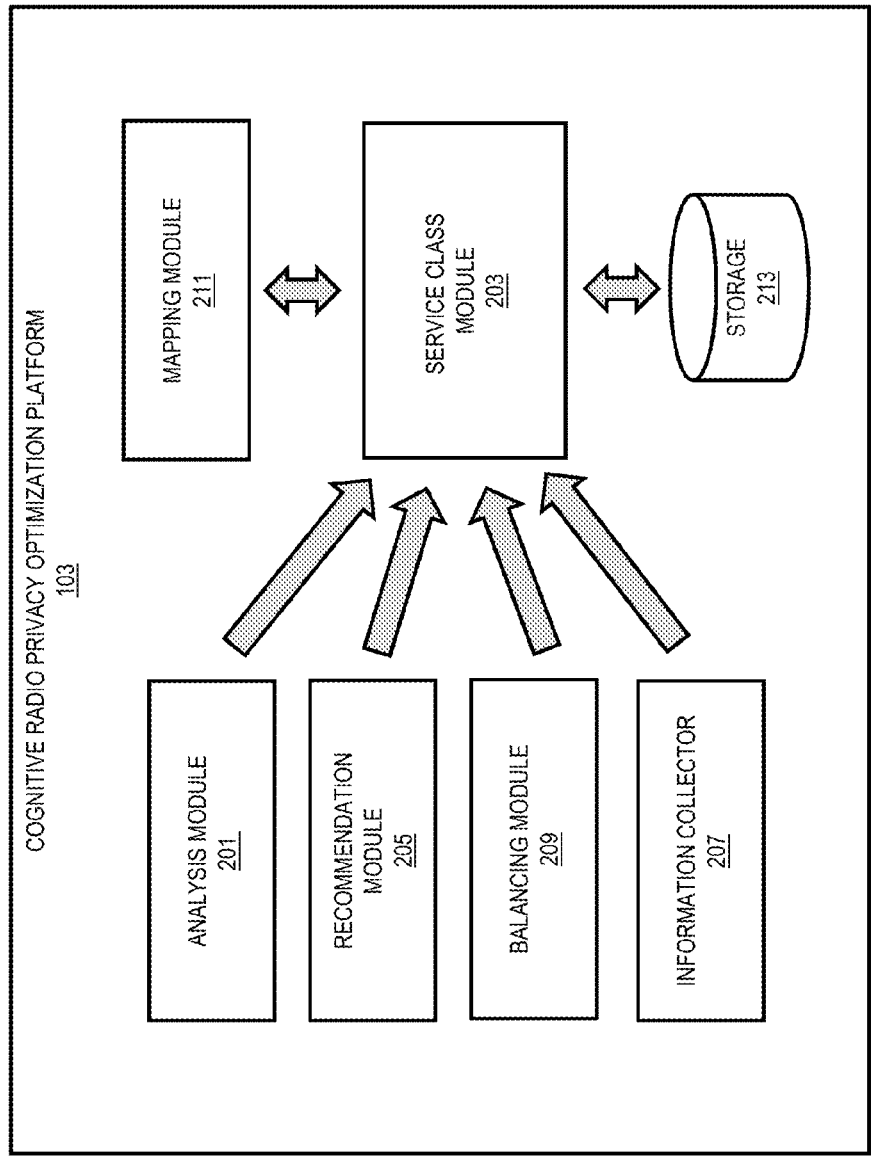
FIG. 2 is a diagram of the components of cognitive radio privacy optimization platform, according to one embodiment.

FIG. 2 is a diagram of the components of a cognitive radio privacy optimization platform, according to one embodiment. By way of example, the cognitive radio privacy optimization platform 103 includes one or more components for providing optimized privacy in cognitive radio information sharing. It is contemplated that the functions of these components may be combined in one or more components or performed by other components of equivalent functionality. In this embodiment, the cognitive radio privacy optimization platform 103 includes an analysis module 201, a service class module 203, a recommendation module 205, an information collector 207, a balancing module 209, a mapping module 211, and a storage 213.

Figure 3:
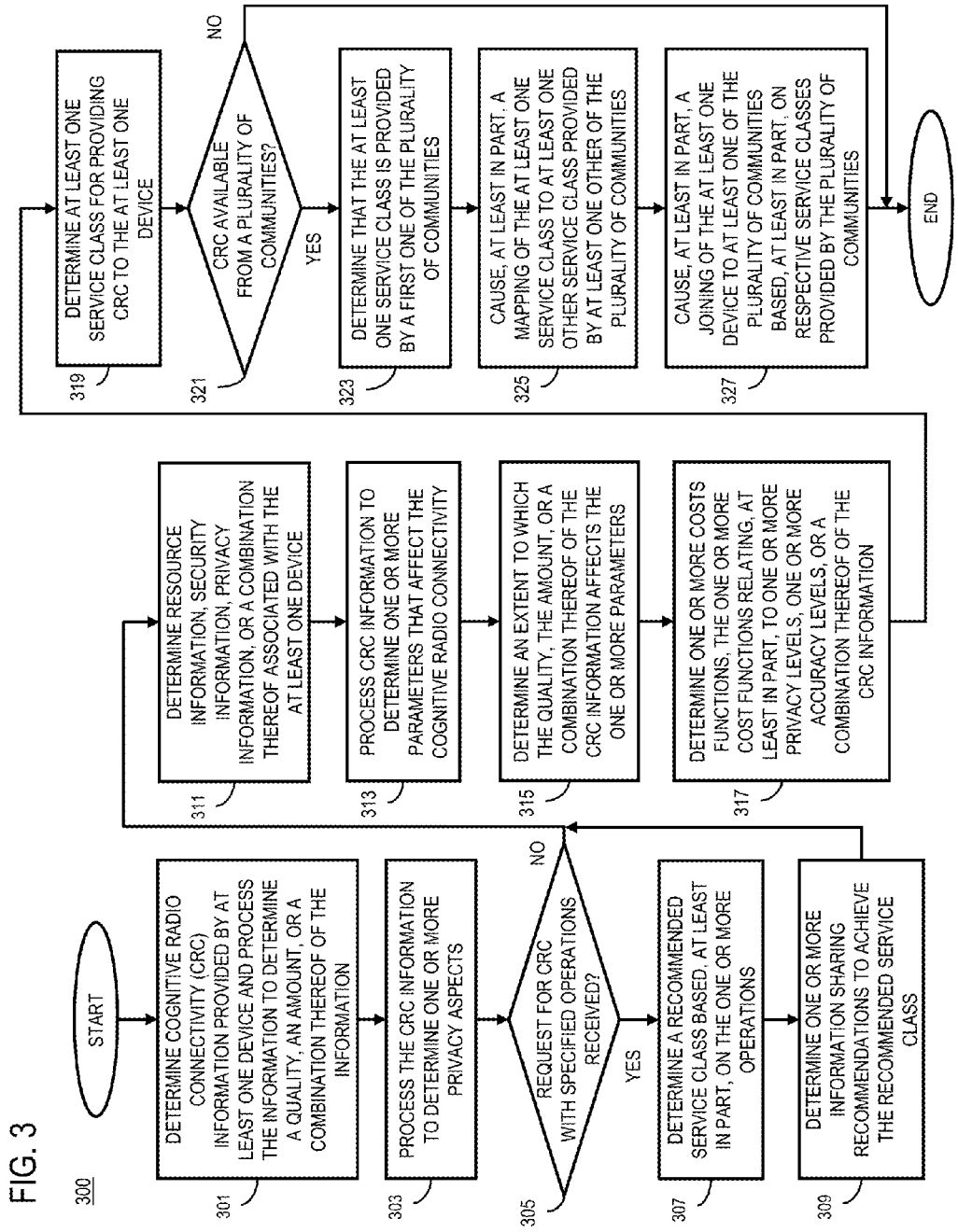
FIG. 3 is a flowchart of a process for providing optimized privacy in cognitive radio information sharing, according to one embodiment.
Figure 10:
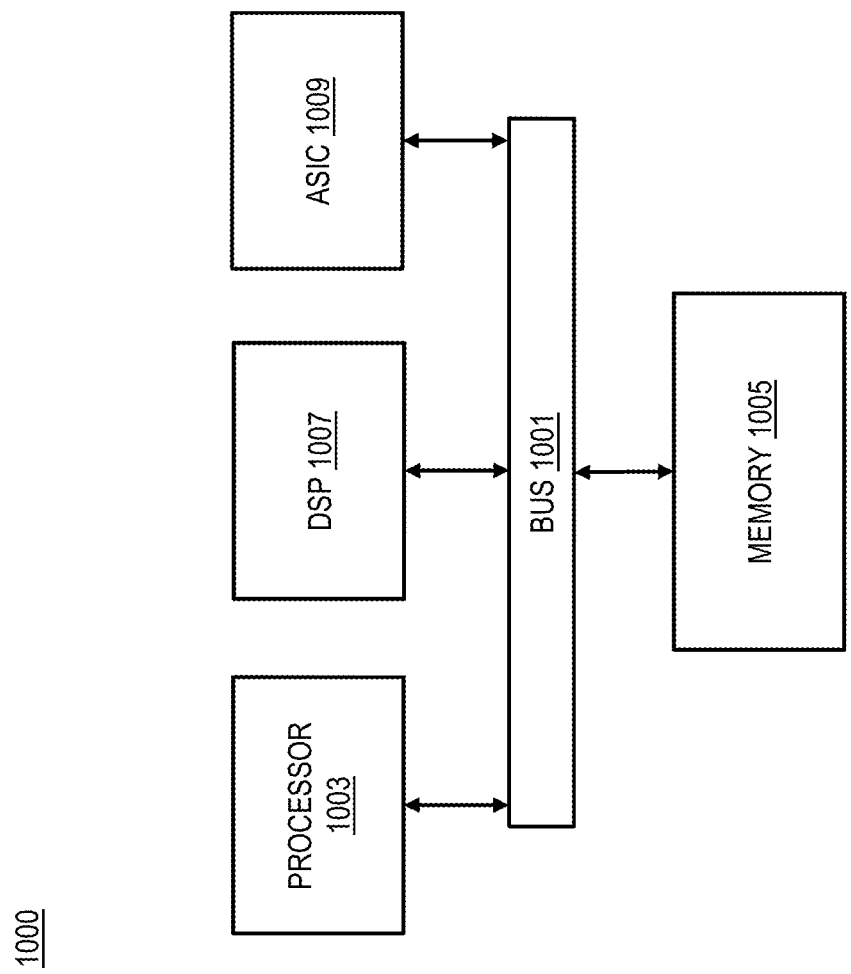
FIG. 10 is a diagram of a chip set that can be used to implement an embodiment of the invention.

FIG. 2 is described with reference to FIG. 3, wherein FIG. 3 shows a flowchart of a process for providing privacy optimization in cognitive radio information sharing, according to one embodiment. In one embodiment, the cognitive radio privacy optimization platform 103 performs the process 300 and is implemented in, for instance, a chip set including a processor and a memory as shown in FIG. 10.

In one embodiment, per step 301 of flowchart 300 in FIG. 3, the analysis module 201 determines cognitive radio connectivity information provided by at least one user via one or more UEs 107a-107i. The cognitive connectivity information, which enables the cognitive radio connectivity system to provide requested connectivity for the user, may include, at least in part, location information, device type and configuration, identity information, connectivity subscriptions information (e.g. an operator data plan with a flat rate fee), group membership information, one or more incentive program participation, information on one or more applications using the cognitive radio connectivity, or a combination thereof.

Upon the determination of the cognitive radio connectivity information, the analysis module 201 processes the information to determine a quality, an amount, or a combination thereof of the cognitive radio connectivity information. The analysis by the analysis module 201 enables the cognitive radio privacy optimization platform 103 to evaluate level of the cognitive radio connectivity information revealed by UEs 107a-107i from the privacy point of view. The analysis module 201 may be equipped with certain mechanisms to determine the privacy level of the UEs 107a-107i based on the amount and quality of the cognitive radio information provides by the UEs, as seen in Table 1.

In one embodiment, each UE 107a-107i may be a member of one or more groups, one or more incentive programs, etc. A group or an incentive program may have certain rules for the amount of information the members should reveal in return for a certain service class or quality service they receive. In one embodiment, the UEs 107a-107i can then provide the group membership information, program participation information, or a combination thereof to the cognitive connectivity provider. The provider can then determine the service class pre-determined for the corresponding groups or the programs.

In one embodiment, if multiple group memberships and/or multiple incentive program participations exist for a UE 107a-107i, the cognitive radio privacy optimization platform 103 may use various optimization methods (e.g., to balance connectivity requirements against available connectivity) in order to determine a service class for the UE 107a-107i.

In one embodiment, per step 303 of FIG. 3, the analysis module 201 processes the cognitive radio connectivity information to determine one or more privacy aspects. The one or more privacy aspects may include, for example, an ownership of the cognitive radio connectivity information, a provenance of the cognitive radio connectivity information (indicating the ownership history of the information), a sensitivity level of the cognitive radio connectivity information, one or more usage rights of the cognitive radio connectivity information (associated to a device 107a-107i, a user, or a combination thereof), one or more entities with access to at least a portion of cognitive radio connectivity information (for example a device 107a-107i, a user, an application, or a combination thereof), a retention of the cognitive radio connectivity information (indicating the persistence of the information, the legal and business requirements regarding the information, or a combination thereof), or a combination thereof.

In one embodiment, per step 305 of FIG. 3, the analysis module 201 determines whether a request for the cognitive radio connectivity, specifying one or more operations, has been received. The request may be initiated by a user, by an application activated by the user, by an application activated by a UE 107a-107i, by a network component, by a computation cloud 111a-111n or a combination thereof. If the request specifies parameters, per step 307 of FIG. 3, the recommendation module 205 determines a recommended service class based, at least in part, on the one or more operations. Furthermore, per step 309, the recommendation module 205 determines one or more information sharing recommendations to achieve the recommended service class. For example, if the specified operation requires a high level of accuracy, a high service class (such as for example class A in Table 1) is recommended, otherwise is the operation has no accuracy requirement a service class B or C may be recommended. It is noted that since various levels of accuracy can be measured, various classes of service may be defined and associated with the devices, users, applications, etc. Following the determination of a recommended service class, the recommendation module 205 may recommend an information sharing level which for example has a direct relationship with accuracy level and an inverse relationship with privacy level.

In one embodiment, if no operations are specified by the request of step 305, in step 311 the information collector 207 determines resource information, security information, privacy information, or a combination thereof associated with the at least one UE 107a-107i.

In one embodiment, per step 313 of FIG. 3, the analysis module 201 processes the cognitive radio connectivity information, previously determined per step 301, to determine one or more parameters that affect the cognitive radio connectivity. For example, a parameter for connectivity can be the distance over which connectivity takes place. In this case the cognitive connectivity may be tuned based on other parameters to deduct an optimal distance for providing suitable service (e.g., a service with requested level of privacy and providing required level of accuracy).

In one embodiment, per step 315, the balancing module 209 determines an extent to which the quality, the amount, or a combination thereof of the cognitive radio connectivity information affects the one or more parameters. The extent may be determined based on pre-defined factors In one embodiment, per step 317 of FIG. 3, the analysis module 201 determines one or more costs functions, the one or more cost functions relating, at least in part, to one or more privacy levels, one or more accuracy levels, or a combination thereof of the cognitive radio connectivity information.

In one embodiment, per step 319 of FIG. 3, the service class module 203 determines at least one service class for providing cognitive radio connectivity to the at least one device based, at least in part, on the quality, the amount, or a combination thereof of the cognitive radio information provided by analysis module 201. In addition to the quality and the amount, the service class module 203 determines the service class based, at least in part, on the privacy aspects determined by the analysis module 201, the resource, security, and privacy information determined by the information collector 207, or a combination thereof, the extent determined by the balancing module 209, the cost functions determined by the analysis module 201, or a combination thereof.

In one embodiment, per step 321 of FIG. 3, the mapping module 211 checks whether the cognitive radio connectivity is available from a plurality of communities. If a plurality of communities offers cognitive radio connectivity, the mapping module 211, per step 323, determines a first community that provides at least one service class. Subsequently, the mapping module 211, per step 325 of FIG. 3, causes, at least in part, a mapping of the at least one service class to at least one other service class provided by at least one other of the plurality of communities. The mapping enables the cognitive radio privacy optimization platform 103 to assign any of the available equivalent service classes to the requesting UE 107a-107i.

In one embodiment, per step 327 of FIG. 3, the mapping module 211 causes, at least in part, a joining of the at least one UE 107a-107i to at least one of the plurality of communities based, at least in part, on respective service classes provided by the plurality of communities, using the mapping of step 325.

FIGS. 4A-4D are diagrams of balanced accuracy and privacy, according to various embodiments. The cognitive radio privacy optimization platform 103 can provide optimal connectivity according to time, place, situation and user needs or applications used. At any situation, one or more parameters can be tuned based on other parameters in order to achieve optimal connectivity over the tuned parameter. For example, the parameter distance over which the cognitive connectivity takes place can be tuned based on other pre-determined parameters, to get optimal distance for the right situation, wherein the pre-determined values are met.

Figure 4A:
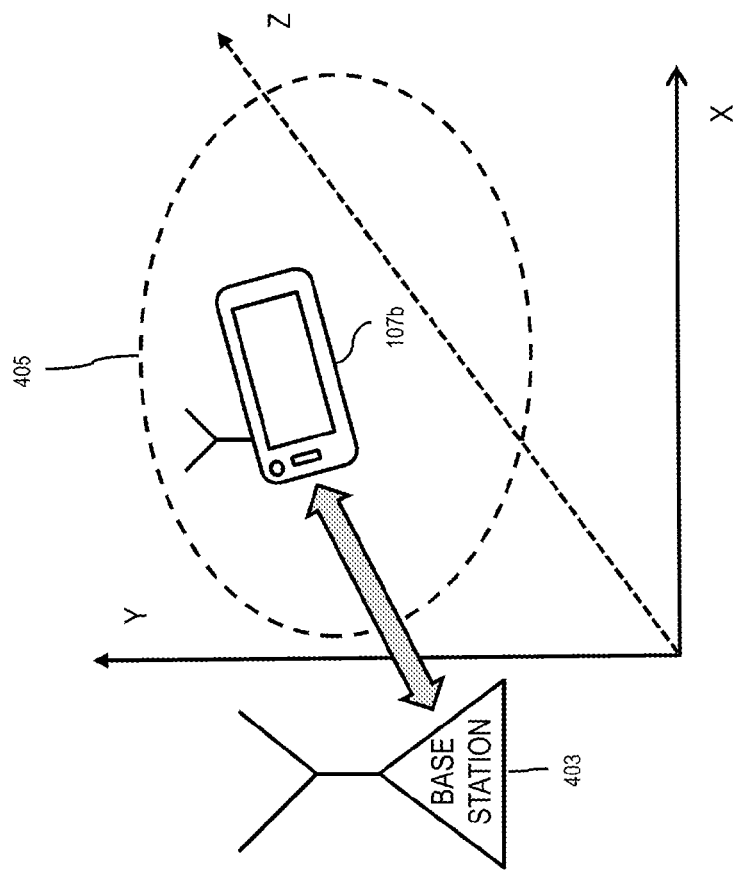
FIGS. 4A-4D are diagrams of balanced accuracy and privacy, according to various embodiments.
Figure 4A:
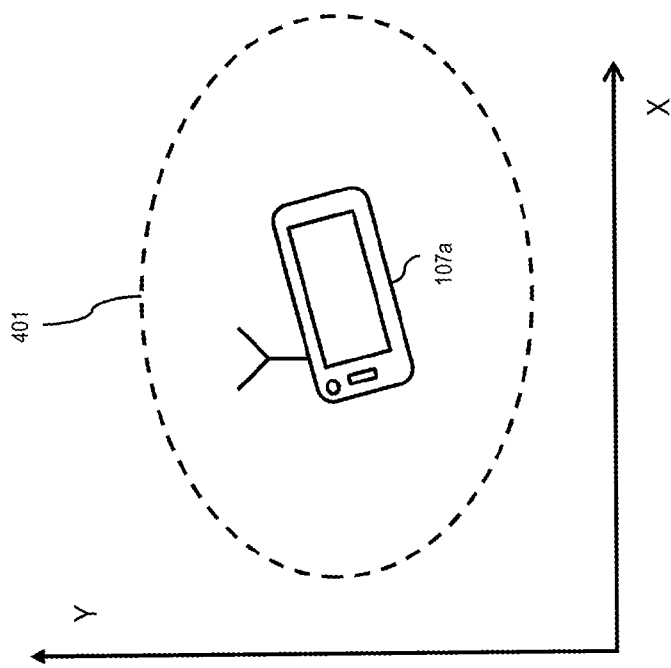

In one embodiment, cognitive radio communication utilizes the TV band (TV whitespace) secondary usage opportunity, where there are cognitive radio rules for each action, and a central database, from where the broadcast for selected frequency is acquired for each device (UE 107a and 107b in FIG. 4A). The UEs 107a and 107b need to check the cognitive radio database regularly. In cognitive radio TV white space, the accuracy in [X-Y] two dimensional space is 50 meters. For example for UE 107a within the circle 401 without direction vector and height (Z) the third dimension, information about available frequency in the respective [X-Y] space and within the 50 meters radius is provided. In other embodiments, in addition to the location of a UE 107b in locality 405, information on direction of connectivity (third dimension of axis Z) is included. As seen in FIG. 4A, the UE 107a has access to the basic level of cognitive radio connectivity based only on location (no direction involved) while UE 107b has access to an advanced cognitive radio including direction vector Z.

In one embodiment, each cognitive radio device 107a and 107b needs to reveal and receive certain set of information with various accuracy levels for the cognitive radio specific characteristics such as location, time, place, situation, application used, etc. For example, a device 107a or 107b needs to know where it is located, what kinds of connections are available at the location, what direction are the connections available from, etc.

In one embodiment, cognitive radio enabled devices broadcast based on certain location capabilities, and accuracy levels. Privacy setting requirements affect the overall device capabilities such as, for example, cognitive radio device to cognitive radio device, cognitive radio device to RF memory tags, local cognitive radio device neighborhood settings based on selected accuracy, etc. If limited amount of information is requested or achieved by a cognitive radio device, the interpretation by the cognitive radio privacy optimization platform 103 may be that local capabilities of the cognitive radio device are limited, and therefore the device may be highly dependent on the capabilities of the available cognitive radio base stations 403.

Figure 4B:
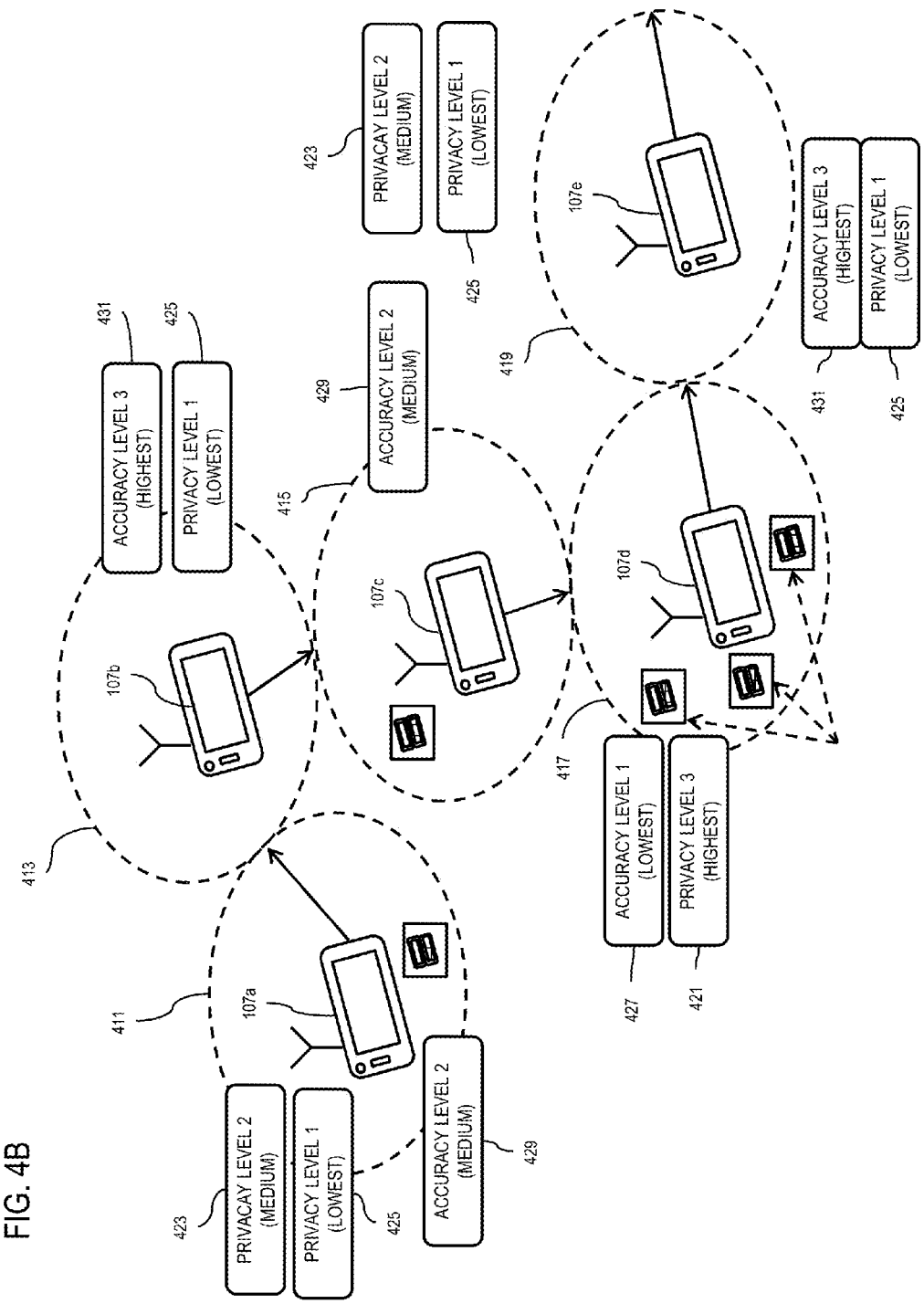

In one embodiment, the cognitive radio decision quality in FIG. 4B is based on capabilities such as privacy, security, load, energy etc. These capabilities may affect cognitive radio location decision capability, which need to be in balance with the set of cognitive radio privacy decision capabilities of FIG. 4C, derived from user, each UE 107a-107e, one or more applications, group of cognitive radio devices 107a-107e, infrastructure and cloud 111a-111n privacy requirements, or a combination thereof. The cognitive radio target and selected result level for decision making by the cognitive radio privacy optimization platform 103 is dependent on what set of capability levels are chosen and at what cost (given a cost function). In one embodiment, cost function may determine that a tuple [privacy, information revealed] needs to primarily satisfy a) the connectivity (best, downgrade), b) the speed, c) the storage, battery levels, and d) device type or class of device, e) other relevant properties, or a combination thereof.

In one embodiment, cognitive radio rules are derived from various sources such as, for example, a central cognitive radio database, a privacy database, the storage 213 of the cognitive radio privacy optimization platform 103, or a combination thereof, where privacy affects the cognitive radio system level, or local resources such as location dependent, local dependent targets such as available RF memory tags for cognitive radio or devices. For example, some requirements for balanced capabilities may be: "User U needs best connectivity, and upgraded cognitive radio location accuracy", "Application A needs to downgrade the location accuracy due to privacy upgrade needs.", "Device 107a needs to transfer information to device 107b with fastest connectivity possible and with downgraded privacy, ", "Due to the fact that devices need privacy, information level needs to be downgraded and due to that suboptimum performance is reachable.", etc. As a result, the tuple [privacy, information revealed] forms optimum/selected cognitive radio quality settings (cognitive radio specific parameters). If certain cognitive radio specific data is revealed, this may affect cognitive radio capabilities of a device or a group of devices causing, for example, missing out certain part(s) of the spectrum, certain frequency re-use, location accuracy, privacy settings, etc.

In one embodiment, in FIG. 4B, UE 107d requires the highest level of privacy level 3, while other UEs 107a, 107b, 107c, and 107e have the lowest privacy requirement of level 1. As a result, the UE 107d is assigned with the lowest accuracy of level 1. On the other hand UEs 107b and 107e have the highest level of accuracy requirement of level 3, which in return leads to lowest privacy of level 1. However, UEs 107a and 107c that may have a medium requirement for accuracy of level 2, can have a privacy level of either equal to the accuracy level 2 of medium level or a lower privacy level of 1 (the lowest level).

Figure 4C:
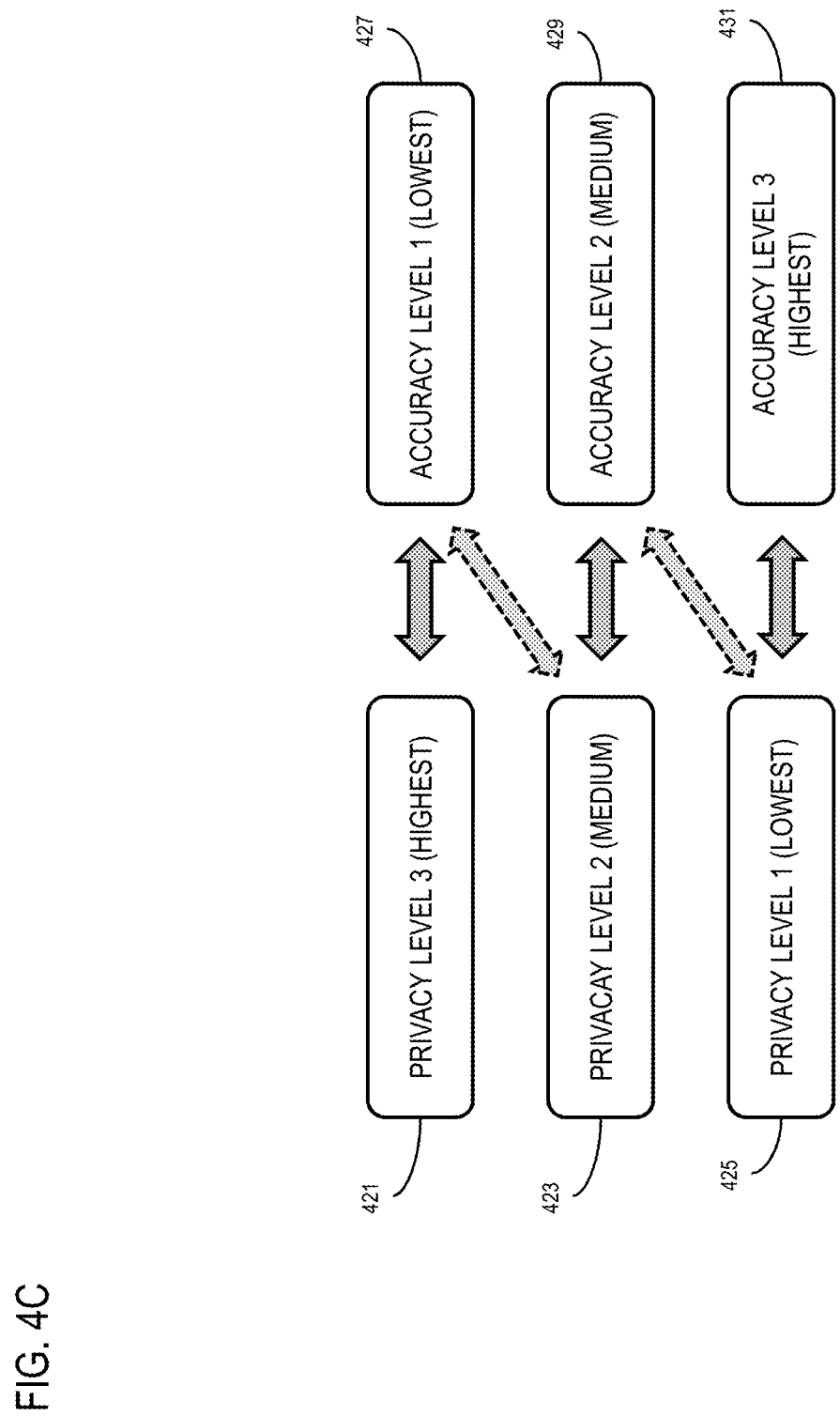
Figure 4D:
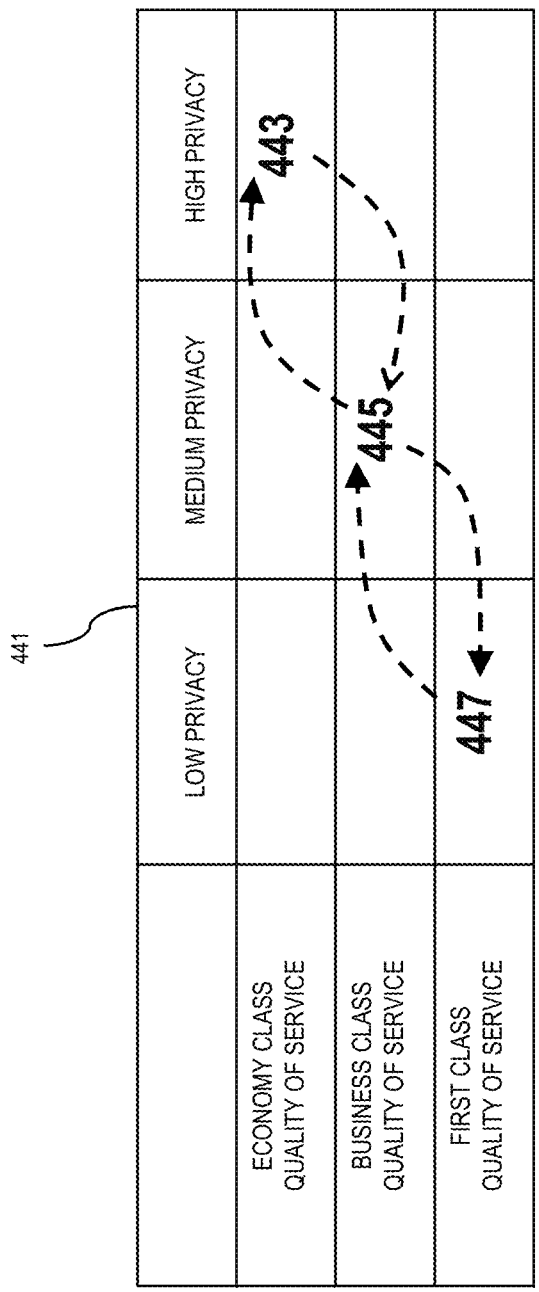

FIG. 4C shows a legend for FIG. 4B wherein the dependency between the privacy level and accuracy level is shown. As seen in FIG. 4C, the highest privacy level 421 is related to a lowest accuracy level 427, while the highest accuracy level 431 is related to the lowest privacy level 425. However, medium levels of privacy 423 or accuracy 429 can be either directly related or each can be linked to a lower level of the other.

In one embodiment, the balance between privacy level and accuracy level can be determined based on a cost function. For example, a cost function may be used to calculate that with a certain level of accuracy required how much information should be revealed, in order for the cost not to exceed a certain threshold.

In one embodiment, if factors such as time, location, neighboring devices, device characteristics (e.g. battery device, plug in device), etc. change or extra cost or upgrade of device capability resources is allowed, then medium levels of privacy 423 and accuracy 429 may select highest levels of accuracy 431 or privacy 421 respectively, as their other pair. For example a device with privacy level 2 (medium) 423 may be able to select the accuracy level 3 (highest) 431, if cost increase is allowed.

In one embodiment, decision rules are selected by the cognitive radio privacy optimization platform 103, not only based on required and revealed information for privacy and accuracy levels, but based on other capabilities (pair of capabilities) that form needed results. For example, if circles 411, 413, 415, 417, and 419 show the location information for UEs 107a-107e respectively, a UE 107c may make the request for a transmission T via cognitive radio as: I am located at location 415. There are UEs 107a, 107b, 107d, and 107e in my vicinity. I need cognitive radio connectivity with best (with any, with what available) radio that is sufficient for transmission T.

In one embodiment, the users within a group can trade their information and receive in return better offerings in terms of service class and/or quality of service. If enough information is shared by members of a group, the members can be promoted to a next group with higher benefits. On the contrary, if provided information is insufficient, the group members may be downgraded to less privileged groups. As seen in table 441 of FIG. 4D, a group in position 443 with highest level of privacy (sharing as little information as possible) receives an economy class of service. However if members of the group 443 are willing to share more information and lower their privacy level to medium (445) or low (447) their quality of service will increase accordingly to business class and first class respectively. On the other hand members of a group in position 447 with low privacy, by requiring more privacy to medium or high will be downgraded with respect to the quality of service.

Such group upgrades can be offered for different types of service classes, starting from the bottom up to the top. For example, if the group of users with lowest service class privilege is offered with an incentive, the group may be upgraded to a different service class or can trade such premium with other users or other groups for a certain benefit.

In one embodiment, the highest service class offers the premium of top like connectivity due to best information available, resulting in most suitable frequencies and connectivity methods to be selected. If a member of a group belongs to a higher level loyalty program, the member or even the connectivity provider may trade the level of loyalty program in exchange of an incentive in return.

Figure 5:
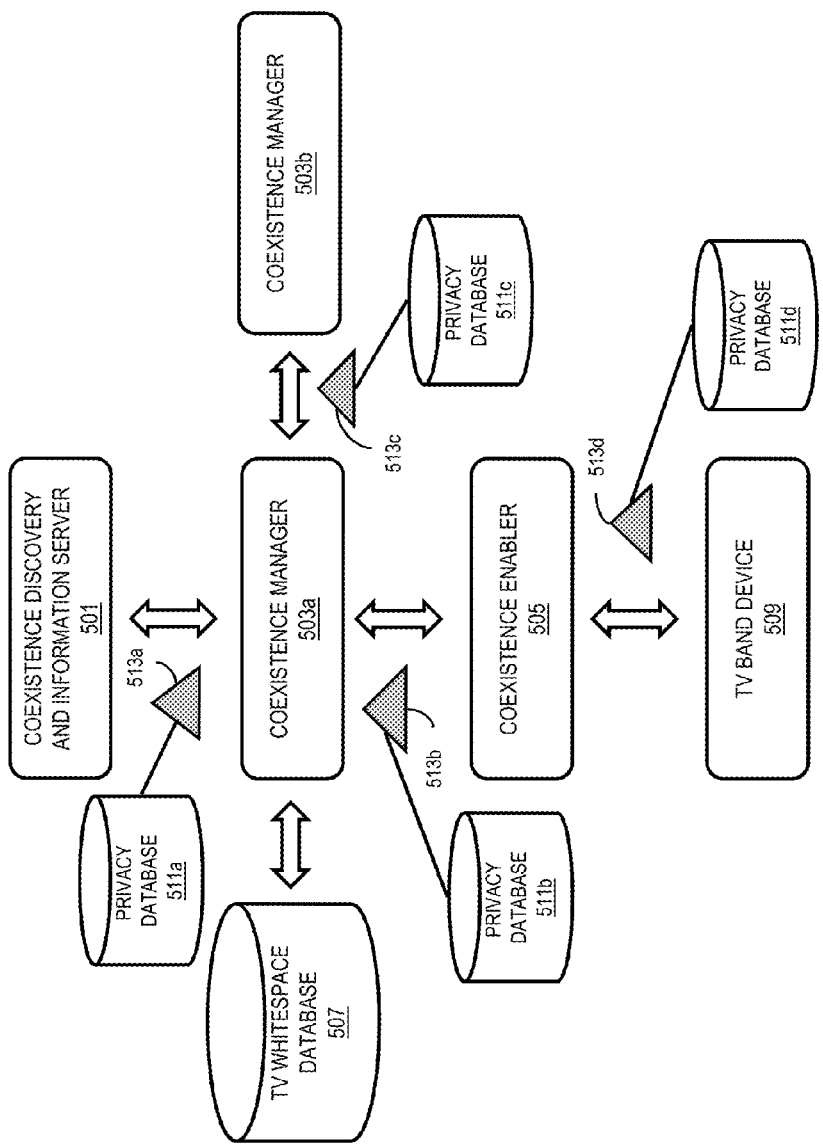
FIG. 5 is a diagram of TV white space cognitive radio architecture with privacy, according to one embodiment.

FIG. 5 is a diagram of TV white space cognitive radio architecture with privacy, according to one embodiment. In one embodiment the Coexistence Discovery and Information Server (CDIS) 501 supports discovery of Coexistence Managers (CMs) 503a in the network and collects aggregate information from other components of the network, wherein each coexistence manager 503a discovers other CMs 503b, performs decision making processes for coexistence of entities on the band, and supports exchange of information among entities and between different CMs 503a, 503b, etc. Additionally, the CMs 503a and 503b have access to the TV white space database 507 in order to discover other CMs and support exchange of information. The Coexistence Enabler (CE) 505 requests and obtains information, required for coexistence, from the TV-band Device or network (TVBD) 509, wherein TVBDs are new unlicensed radio frequency devices operating in the vacant channels or white spaces. Furthermore, the CE 505 translates reconfiguration requests and/or commands to TVBD specific format. This represents the architecture for TV white space cognitive connectivity, being standardized in IEEE 802.19.

In the embodiment of FIG. 5 the privacy enablers 513a, 513b, 513c, and 513d control the privacy of cognitive radio information sharing respectively between the coexistence discovery and information server 501 and the coexistence manager 503a, between the coexistence manager 503a and the coexistence enabler 505, between the coexistence manager 503a and the coexistence manager 503b, and between the coexistence enabler 505 and the TV band device 509. Each privacy enabler 513a-513d also has connectivity to a privacy database 511a-511d, wherein the privacy databases 511a-511d may be distributed databases communicating with each other, be components of a centralized database, or a combination thereof.

In one embodiment, the privacy enabler 513d sets the privacy client for the path between TVDB 509 and the coexistence enabler 505 to "ON" status and updates selected rules and settings in the privacy database 511d.

In one embodiment, the coexistence enabler 505 requests capabilities from the coexistence manager 503a. The privacy enabler 513b checks the privacy database 511b for answers to questions such as, "what is the cognitive enabler allowed to do?" using the privacy enabler 513b settings as parameter.

In one embodiment, the coexistence manager 503a collects information such as locations, request neighborhood ("who else is there") etc. from the coexistence discovery and information server 501, using privacy enabler 513a settings as parameter.

In one embodiment, the coexistence manager 503a may be local while the coexistence manager 503b may be a remote coexistence manager, wherein the privacy of interaction between the coexistence managers 503a and 503b can be may provided by the privacy enabler 513c associated with the privacy database 511c.

In one embodiment, a white space architecture 507 may utilize privacy policy rules for what data it is allowed to access (from upper levels of the architecture) and what it is not, for example, by setting a privacy enabler on or off. Additionally, each level of the architecture can be treated independently with privacy policy rules for what they are allowed to forward (as plain visible text, and what they are not) between the cognitive radio white space blocks. Those blocks may also have the ability to independently utilize other (or same) privacy policy rules for output data.

In one embodiment, regular users of cognitive connectivity can be offered better quality of service than the level of information they reveal would otherwise allow them to get, by joining a group such as, for example, a loyalty group. The group identity or identities are attached to the privacy information such that, as a result, the collective information on the group can be used to provide a higher class of service, a better quality of service) to the group members. For example, if users allow that their usage patterns be recorded (e.g. by joining a loyalty program), their information (including past information) can be used to optimize the quality of service. Additionally, the longer users are with a group (e.g., use the cognitive connectivity via the group), the higher their rank can be in the group which can affect the quality of service the users receive. On the other hand, accumulation of history information regarding group members enables the cognitive radio providers to provide better connectivity to the users. The more information the users reveal on themselves, the faster can they raise their rank in the group.

Figure 6:
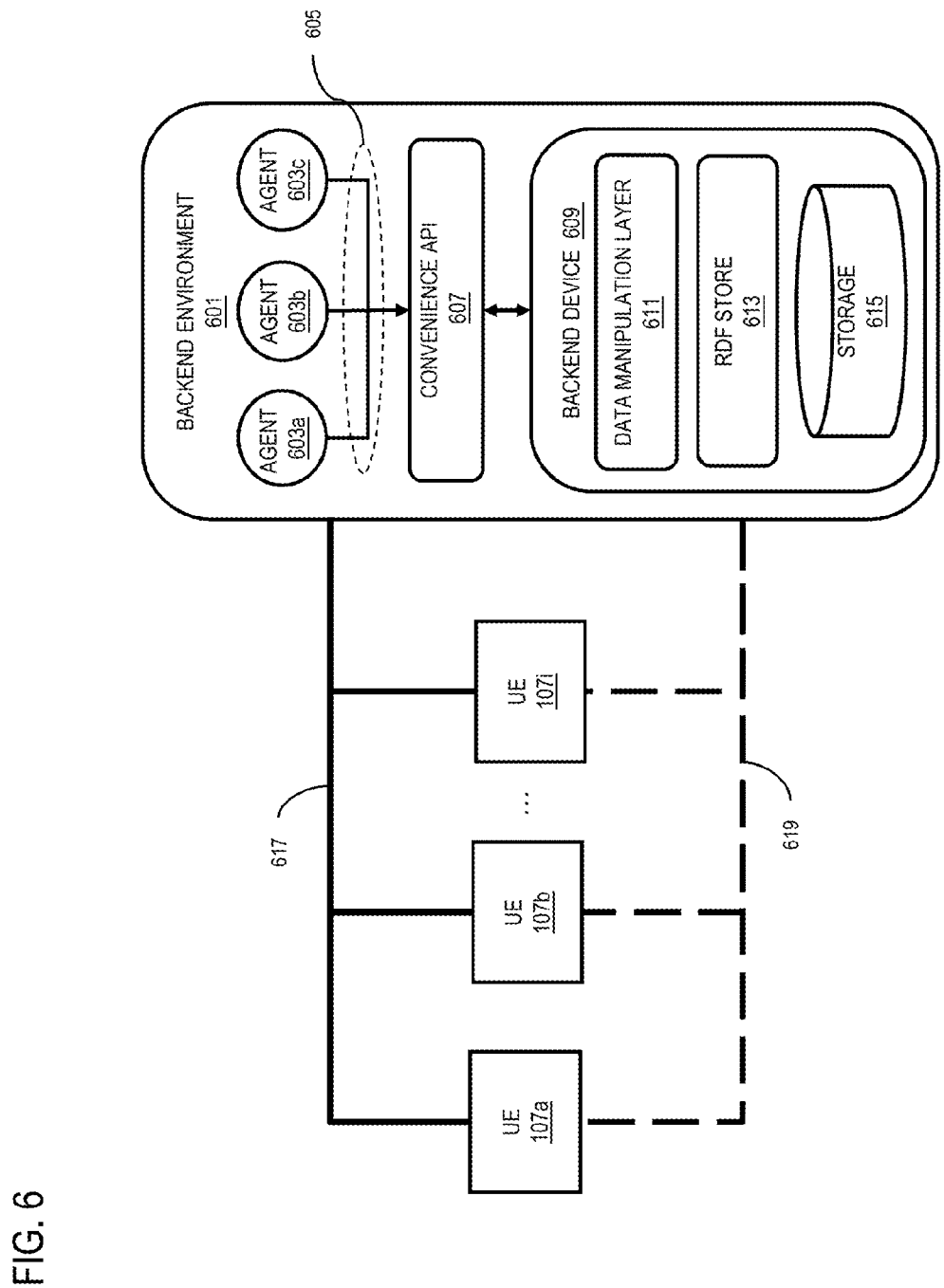
FIG. 6 is a diagram of using cloud environment for sharing cognitive radio information, according to one embodiment.

FIG. 6 is a diagram of using cloud environment for sharing cognitive radio information, according to one embodiment. In one embodiment, utilizing cloud environment 111a-111n for sharing cognitive radio information, provides broader information sharing structure than, for example, what WURFL provides. The cognitive radio structure can utilize WURFL as an interoperable service (along with other data sources), wherein the WURFL may access the backend environment 601 and provide direct cognitive radio specific access to UEs 107a, 107b, ..., 107i with necessary parameters. If information sharing via WURFL fails to extract and provide various cognitive radio parameters such as location, frequencies, etc. any other suitable data sources (service provides) can be utilized to reconstruct such information or derive it from other data.

In one embodiment, the backend environment 601 is a network infrastructure. The backend environment may also be a virtual run-time environment within a cloud 111a-111n associated with the owner of one or more UEs 107a-107i or on another UE 107b associated with the user. The backend environment 601 may include one or more components (backend devices) 609 and one or more Application Programming Interface (API) such as a convenience API 607 that may include APIs tailored to the software development environments used (e.g. JAVA, PHP, etc.). Furthermore, UEs 107a-107i may include client APIs (not shown) each API enabling interaction between devices and components within another device or an environment. For example, the convenience API 607 enables interaction between the backend device 609 and agents 603a, 603b, and 603c, wherein each agent is a set of processes that handle computations within the backend environment 601. Connections 617 and 619 respectively represent distribution paths of data and control among the environment 601 and UEs 107a-107i. The storage 615 is a repository of information and computations that can be accessed and used by all the UEs and infrastructure components having connectivity to the backend environment 601.

In one embodiment, the backend device 609 may be equipped with a data manipulation layer 611 that monitors and manages any access to the storage 615.

In one embodiment, the cognitive radio privacy optimization platform 103 extracts cognitive radio specific parameters, by sniffing, interrogation, or a combination thereof, from the backend environment 601 associated with cloud 111a-111n and translates the parameters into specific expressions of the cognitive radio. The cognitive radio privacy optimization platform 103 may also utilize storage 615, which is part of the information space 113a-113m, for storing shared cognitive radio information, white space database, or a combination thereof.

In one embodiment, one or more UEs 107a, 107b, ..., 107i may request and inform their (spectrum) findings to the common cognitive radio database (e.g. storage 615 in the backend device 609, storage 213 of cognitive radio privacy optimization platform 103, backend environment 601, or a combination thereof). In response, the backend device 609 may send settings and other response information back to configure UEs 107a-107i. The cognitive radio privacy optimization platform 103 (shown in FIG. 1) may monitor correct utilization of the received settings by the UEs 107a-107i at certain locations, under certain regulations, etc.

The backend environment 601 may include several layers (e.g. L1, L2, L3) shown as circle 605, which provide fine instruments for developers to access particular layers for development. The layers 605 describe different abstraction layers attached to different convenience layers, convenience API 607. In one embodiment, the cognitive radio functions can be mapped to level L3 as a cognitive radio domain specific API. The cognitive radio domain can be built based on location, frequency and rules information.

In one embodiment, the cloud 111a-111n may have a platform API, which is specific to mobile applications, defining location, bearer, short range communications, etc., and when cognitive radio specific functions (e.g. cognitive radio domain information) are mapped into the platform API, it forms a cognitive radio specific platform API.

In one embodiment, the Data Manipulation Layer (DML) 611 provides connectivity, privacy, security policies API, which will fetch policy rules from storage 615 or any other storage spaces associated with cloud 111a-111n and apply them to the ongoing data-stream.

In one embodiment, the cognitive radio database information, is based on locations wherein each location may be under certain regulations (legislation), allowing certain frequencies to be used at the location.

In one embodiment, as previously described, there may be two options (functions) for cognitive radio specific operations, namely, sniffing (associated radio sensing and listen before talk) such as for example, transmitting, sniffing vacant channels (channel numbers, characteristics); and interrogation (with local agreement). In the interrogation method, the cognitive radio privacy optimization platform 103 has knowledge of occupied channels and provides protocols for communication among UEs 107a-107i, including rules, candidate neighbors, operation and measurement configurations, etc.

In one embodiment, sniffing includes scanning the environment, whereas interrogation provides more local and global interactions, also selecting the used setup. Sniffing is a subset of interrogation, as interrogation provides more information.

Figure 7:
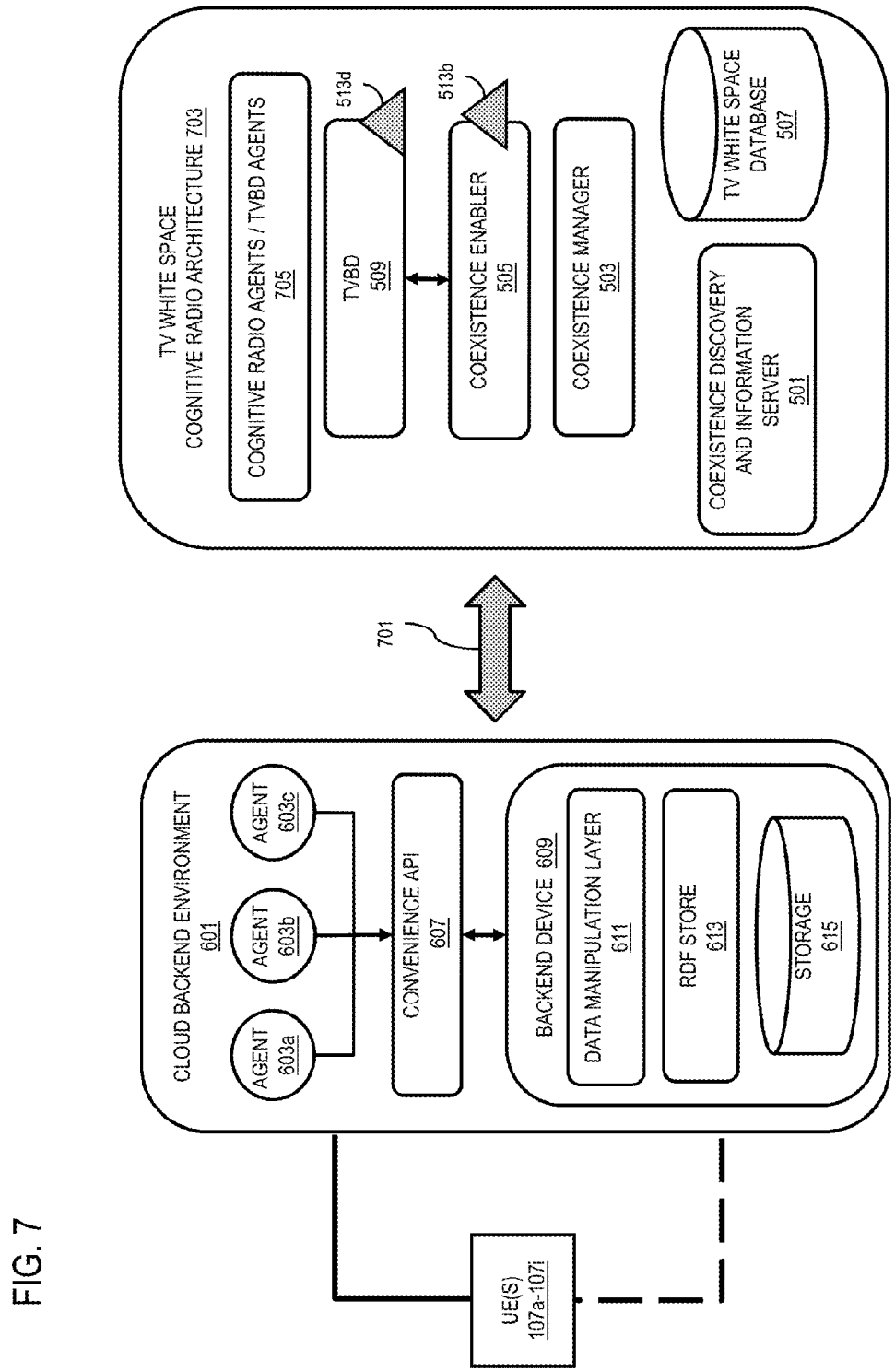
FIG. 7 is a diagram of mapping between cloud environment and cognitive radio environment, according to one embodiment.

FIG. 7 is a diagram of mapping between cloud environment and cognitive radio environment, according to one embodiment. In one embodiment, the cognitive radio enabled UE 107a-107i requests the cloud backend environment 601 generalized representation, wherein the TV white space cognitive radio architecture 703 is mapped to the backend environment 601 (shown as arrow 701).

In one embodiment, the cognitive radio privacy optimization platform 103 uses sniffing or interrogation methods and reutilizes the methods in the convenience API 607. The cognitive radio specific API may consist of information such as regulations, bandwidth information and their characteristics, etc. in order to provide cognitive radio specific operations, method of choice (e.g. sniff or interrogate the cognitive radio information from the environment 703).

In one embodiment, mapping 701 is performed on the technologies of the CR architecture environment 703 and the cloud backend environment 601. The cognitive radio functionality information, such as for example location, regulation, frequency, etc. which can be extracted from a cognitive radio specific database (not shown) can be mapped to, for example, platform API, so that the technology map is:

Location (CR)→Location API

Legislation/Regulation (CR)→Connectivity/Privacy/Security Policies API

Frequency (CR)→NEW (or Bearer API)

In one embodiment, the cognitive radio specific API may consist of location API, Connectivity/Privacy/Security Policies API, frequency API or a combination thereof. As seen above, the frequency API may be a new API at the backend environment 601. Alternatively, the frequency can be mapped to a current Bearer API (not shown). The cognitive radio privacy optimization platform 103 may use sniffing, interrogation or a combination thereof to determine vacant and occupied frequencies with support from cloud environment 601.

In one embodiment, for example, a cognitive radio enabled UE 107*a* may be associated with a specific location and the connectivity, privacy, security policy rules (API, regulation) with tune up parameters attached to the location. In this embodiment, particular information associated with the location can be extracted from the cloud 111*a*-111*n*.

In another embodiment, a cognitive radio enabled UE 107*b* may be associated with a specific location and the connectivity, privacy, security policy rules (API, regulation) with tune up parameters attached to the location and to a selected frequency. In this embodiment, particular information associated with the location and the frequency can be extracted from the cloud 111*a*-111*n*.

In one embodiment, a cognitive radio enabled UE 107*c* may request direct subscription for device to device communication from location parameters, cloud backend environment Data Manipulation Layer 611 figuring equivalent parameters and enabling these devices to communicate directly. If no DML database exists, a wrapper may be used to provide connection to device storage 615.

In one embodiment, a virtual copy of the local findings and settings of cloud based cognitive radio database can be used at UE level (locally) to allow direct device to device (e.g. UE to UE) cognitive radio connections. The two UEs can form a group in which findings and settings are treated as group findings, and are updated to the backend 601 as well.

In one embodiment, personal or private area settings on a UE 107*a* may be locally available on a Radio Frequency (RF) memory tag (e.g. home mode, wherein the cognitive radio environment may be more static than other outdoor or public environments), where each cognitive radio enabled UE 107*a*-107*i* can pull and push settings for that area from/to RF memory tag. In this embodiment, cognitive radio parameters may be determined periodically or at every touch to the RF memory tag and the determined parameters stored in the RF memory tag for later use and for other UEs to use.

In one embodiment, the privacy enabler 513*d* and 513*b* locations in FIG. 7 can be at the edge of the device access to cognitive radio (e.g. between coexistence enabler and TV band device), where privacy policy applied to single device level (about "Me and my data" or "friend" privacy of FIGS. 7A-7B). Additionally privacy enabler may consist of multiple device privacy policies entering the cognitive radio environment, where privacy policy also takes into account cognitive radio specific coexistence parameters enabling common or separate privacy policies (and privacy zones between those devices). Privacy zone is dependent on cognitive radio location parameter; whether cognitive radio allows computational support to apply certain computational level for this privacy case (e.g. country specific privacy may restrict certain cognitive radio privacy enabler functionality to invalidate particular cognitive radio parameter visibility at that zone, or location).

Figure 8:
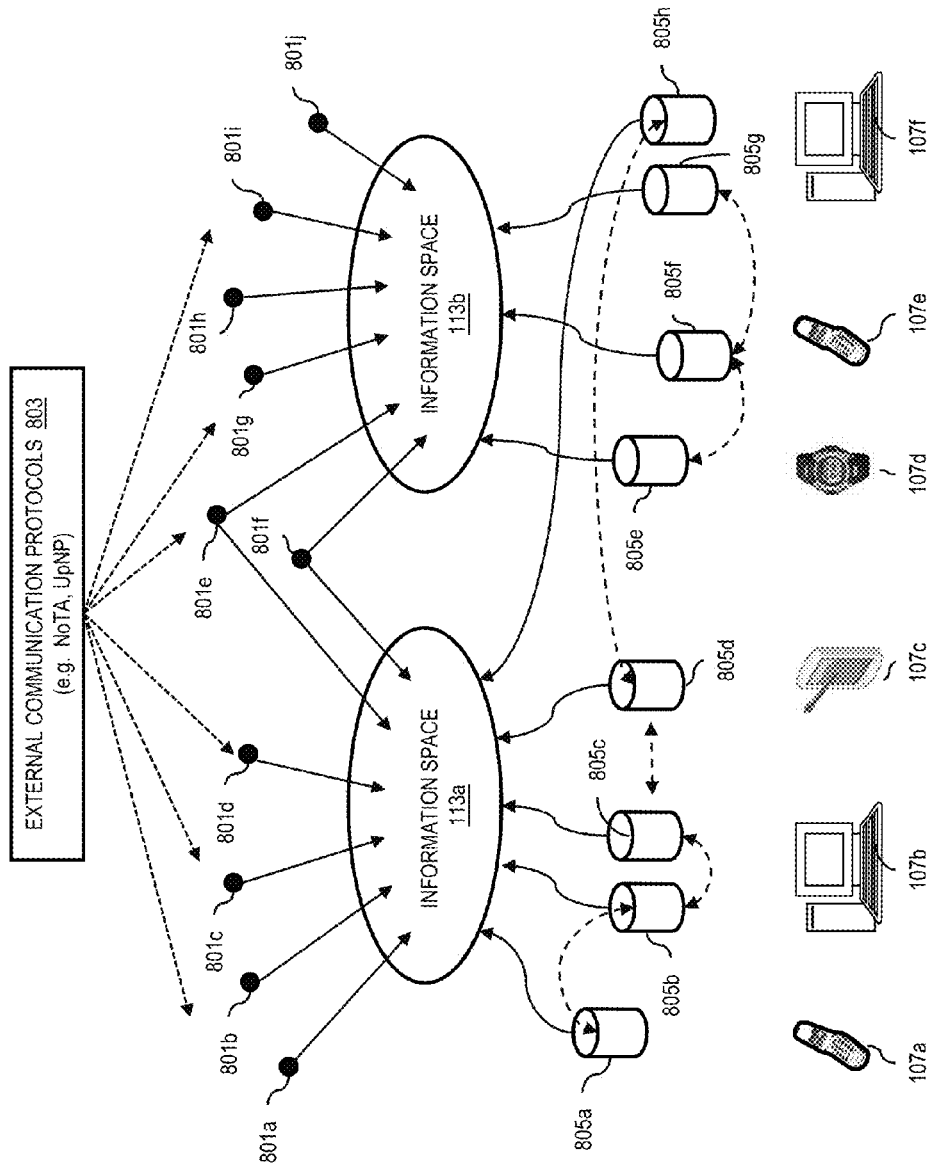
FIG. 8 is a diagram of an information space architecture used for providing cognitive radio information sharing, according to one embodiment.

FIG. 8 is a diagram of an information space architecture used for providing cognitive radio information sharing, according to one embodiment. In FIG. 8 two information spaces 113*a* and 113*b* are connected to knowledge processors 801*a*-801*j*. Some of the knowledge processors such as 801*e* and 801*f* are connected to more than one information spaces. In addition, some knowledge processors 801 use external communication protocols 803 outside of the information spaces environment. For example knowledge processors 801*c*, 801*d* and 801*e* may be connected through the NoTA network while knowledge processors 801*e*, 801*g* and 801*j* are connected through UPnP network. The knowledge processors 801*a*-801*j* may each consist of components such as user-interfaces, internal logics, connectivity components, etc. (not shown). A knowledge processor 801*a*-801*j* may generally run on a single device, even though it may have internal distribution. Such a device may be a mobile device/phone, personal computer, active sensor, Radio Frequency Identification (RFID) tag, etc.

The connectivity component of the knowledge processors 801*a*-801*j* (not shown) contains the logic and functionality to communicate to various information spaces 113*a*-113*m*. Connectivity is over some network protocol to a semantic information broker (SIB) 805*a*-805*h*. A semantic information broker 805*a*-805*h* contains the logic for parsing messages and pointers to subscription handlers between the knowledge processors 801*a*-801*j* and the information space 113*a*. A knowledge processor 801*a*-801*j* may potentially connect to more than one information spaces at a time thus distributing and synchronizing the operations across all connected information spaces.

The basic functionality provided by the connectivity protocols at this level for manipulating information and for connection to an information space 113*a*-113*m* is given below:

Insert: insert information in information space 113*a*-113*m* (as an RDF graph) atomically (e.g., at the level of the smallest information element of the information space 113*a*-113*m*), Retract: remove information from information space 113*a*-113*m* (as an RDF graph) atomically, Update: update information on information space 113*a*-113*m* (as an RDF graph) atomically—often implemented as a retract and insert through the transaction system, Query: synchronously (blocking) query; retrieve information from information space 113*a*-113*m*, Subscribe: asynchronously (persistent, non-blocking) set up a subscription to the information space 113*a*-113*m* for a given query, Unsubscribe: terminate a given subscription to information space 113*a*-113*m*, Join: request initiation of an interaction session between a knowledge processor 801 and a given information space 113*a*-113*m*, Leave: terminate the current interaction sessions between a knowledge processor 801 and the information space 113*a*-113*m*.

The information space 113*a*-113*m* is "virtual" in nature in the sense that its existence is provided by the underlying semantic information brokers 805*a*-805*h* which are the elements that "physically" exist. Within the scope of an information space 113*a*-113*m*, capabilities for local reasoning over the information contained in that information space are provided through a deductive closure calculation mechanism (not shown). The mechanisms for managing connections and operations of knowledge processors 801*a*-801*j* and for distributing the information around information spaces 113*a*-113*m* can be implemented by more than one SIB 805 distributed over different processing elements.

The interaction among knowledge processors 801*a*-801*j* and information spaces 113*a*-113*m* is accomplished by network connections to one or more SIBs 805*a*-805*h* providing or representing the information space. As far as the user or designer of a knowledge processor 801a-801j is concerned, there are knowledge processors 801a-801j and information spaces 113a-113m and the connectivity layer abstracts away the physical connection to a SIB 805a-805h.

Additionally the semantic information brokers 805a-805h may be distributed over a number of different devices 107a-107f. For example, SIB 805a is on device 107a and SIBs 805b and 805c are on device 107b. However as seen in FIG. 8 each set of SIBs represent one information space at a time. For example, SIBs 805a-805d and 805h represent information space 113a while SIBs 805e-805g represent information space 113b. Some devices can run more than one SIB representing different information spaces concurrently. For example device 107f runs SIB 805g which represents information space 113b and at the same time runs the SIB 805h that represents information space 113a.

The system can be implemented on various platforms including mobile devices, personal computers, etc. The main requirement of such implementation platforms is that the devices support the runtime environments and that enough processing power and storage is available. Given that knowledge processors 801a-801j can be distributed over devices with more processing power and/or storage as necessary, usually smaller hand-held devices are adequate for running these knowledge processors.

In one embodiment, a SIB 805a-805h may run on systems supporting the Python runtime environment and additionally versions for C++ specifically exist for Linux/Unix and Open-C for Symbian operating system. Client libraries for knowledge processors 801a-801j may exist in Python, C, C++ (Linux/Unix and Symbian) as well as Java. Other environments based on Web services and Javascript can also be used.

In another embodiment, the system implementations run on Mobile Devices (including: N800/810, N95) and personal computers (Unix, Linux, Windows). The knowledge processors 801a-801j can run on sensors, etc. Communication is made over TCP/IP and HTTP protocols which can be used over Ethernet, GPRS and 3G transports.

The information spaces 113a-113m can be represented using Semantic Web standards such as Resource Description Framework (RDF), RDF Schema (RDFS), OWL (Web Ontology Language), FOAF (Friend of a Friend ontology), rule sets in RuleML (Rule Markup Language), etc. For example, RDF is a family of World Wide Web Consortium (W3C) specifications originally designed as a metadata data model. RDF has come to be used as a general method for conceptual description or modeling of information that is implemented in web resources; using a variety of syntax formats. The underlying structure of any expression in RDF is a collection of triples, each consisting of three disjoint sets of nodes including a subject, a predicate and an object. A subject is an RDF Uniform Resource Identifier (URI) reference (U) or a Blank Node (B), a predicate is an RDF URI reference (U), and an object is an RDF URI reference (U), a literal (L) or a Blank Node (B). A set of such triples is called an RDF graph. Table 2 shows sample RDF triples.

TABLE 2

| Subject | Predicate | Object |
| --- | --- | --- |
| uri:// . . . /rule#CD-introduction, | rdf:type, | uri:// . . . /Rule |
| uri:// . . . /rule#CD-introduction, | uri:// . . . /rule#assumption, | "c" |

The basic operations on an information store are insertion of a graph, retraction (deletion) of a graph, querying and subscription for information. Insertion and retractions may be combined into a single transactional structure in order to admit atomic updates through the atomic application of retract and insert. All other forms of operations are constructions and refinements of the above. For example, update is constructed out of a set of retracts and inserts. Further rewrite rules can simplify the recurrent application of operations.

In one embodiment, a query is evaluated based on the current snapshot of the information in the information space 113a-113m. Queries can be performed by Wilbur query language (WQL) or simple RDF triple pattern matching. WQL is a lisp-like path based query language. One important difference between WQL and RDF triple pattern matching is that Wilbur's static reasoning engine only runs with WQL queries. WQL queries return a set of RDF graph nodes, while the pattern queries return an RDF graph. Furthermore, other query languages such as SPARQL are also supported.

In another embodiment, subscriptions are implemented as persistent queries, that is, a given query is evaluated whenever the information in the information space 113a-113m changes, and thus the same methods are available. The results are transmitted to the knowledge processors 801a-801j only when they are changed. Depending on parameters, either the full results or a differential is transmitted.

According to the stated ontologies, no attempt is made by the information space 113a-113m to enforce consistency or integrity of information. However, internal reasoning knowledge processors (not shown) may be present which can perform this activity if the information space 113a-113m has been configured accordingly. Information is explicitly semi-structured and may take on any form that the knowledge processors 801a-801j insert or retract.

Presence of typing constructs and namespaces does not necessarily mean that a knowledge processor 801 querying for that information will interpret the information according to the implied ontology. A namespace is an abstract container or environment created to hold a logical grouping of unique identifiers or symbols (e.g. names). The semantics of the information is interpreted by the reader, merely implied by the writer and grounded in the real world context of the knowledge processors 801a-801j. Therefore, any two given knowledge processors may disagree about the semantics. This concept is generally referred to as pragmatic or intentional semantics.

The information spaces 113a-113m provide further functionality regarding the joining and leaving of knowledge processors 801a-801j and policy management. Knowledge processors 801a-801j have a set of credentials which are passed during the "join" operation. The counterparts of the knowledge processor 801a-801j instantiated "leave" and "join" operations are the information spaces 113a-113m instantiated "invite" and "remove" operations. These operations are not necessarily provided by every information space 113a-113m nor understood by every knowledge processor 801a-801j.

Connectivity is provided through a set of listeners which provide access via any given specified transport protocol. TCP/IP is the most used transport, but a Bluetooth based listener or one that uses HTTP/S have also been developed. Listeners can provide pre-processing of the incoming messages if necessary; for example with Bluetooth profiles. Any number of listeners may be provided at any time (at least one is necessary).

Furthermore and in some respects similar to that of the principles of information distribution, the connectivity of an information space 113a-113m can also be seen as a union of all listeners in all SIBs 805a-805h. However, not all listeners may be available on all physical locations (consider Bluetooth or TCP/IP over WLAN for example).

In one embodiment, the cognitive radio privacy optimization platform 103, performs the process described by the flowchart 300 of FIG. 3 to manage cognitive radio information sharing among cognitive radio enabled devices 107a-107f using the information spaces 113a-113m, wherein the information spaces 113a-113m are configured based on the architecture described in FIG. 8.

The processes described herein for providing optimized privacy in cognitive radio information sharing may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
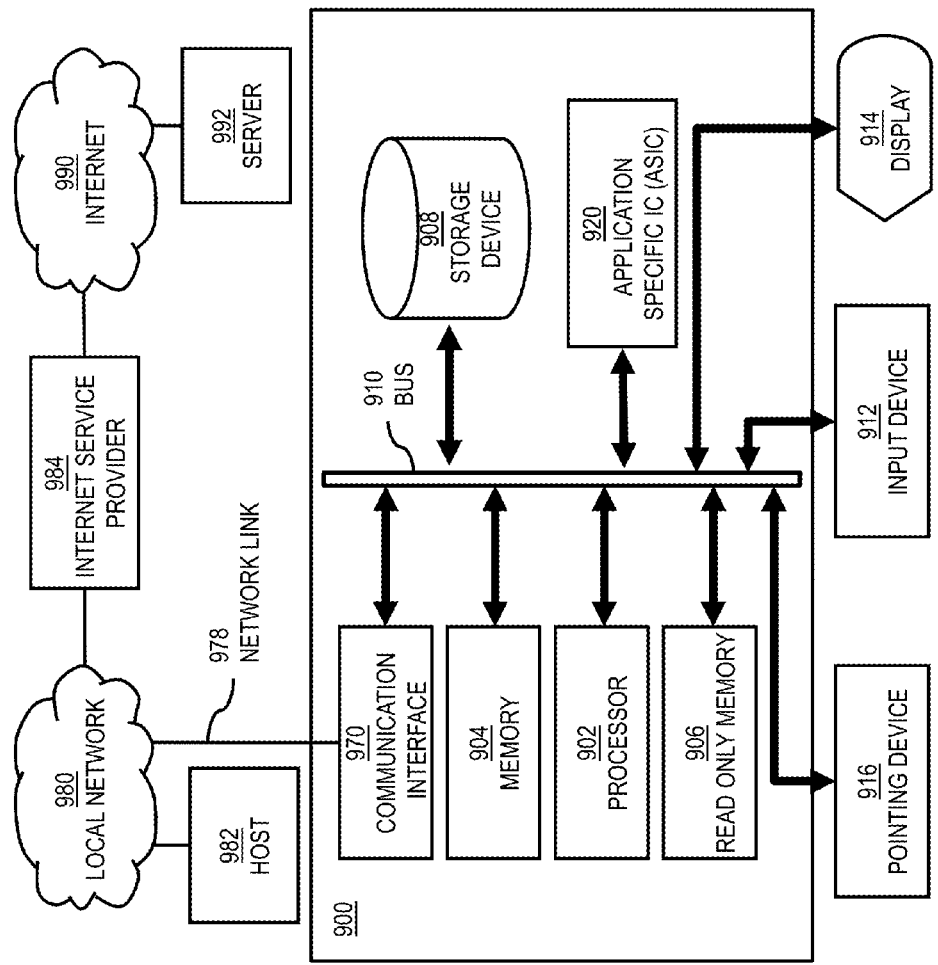
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to provide optimized privacy in cognitive radio information sharing as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of providing optimized privacy in cognitive radio information sharing.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to providing optimized privacy in cognitive radio information sharing. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or any other dynamic storage device, stores information including processor instructions for providing optimized privacy in cognitive radio information sharing. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for providing optimized privacy in cognitive radio information sharing, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for providing optimized privacy in cognitive radio information sharing to the UEs 107*a*-107*i*.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to provide optimized privacy in cognitive radio information sharing as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of providing optimized privacy in cognitive radio information sharing.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to provide optimized privacy in cognitive radio information sharing. The memory 1005 also stores the data associated with or generated by the execution of the inventive steps.

Figure 11:
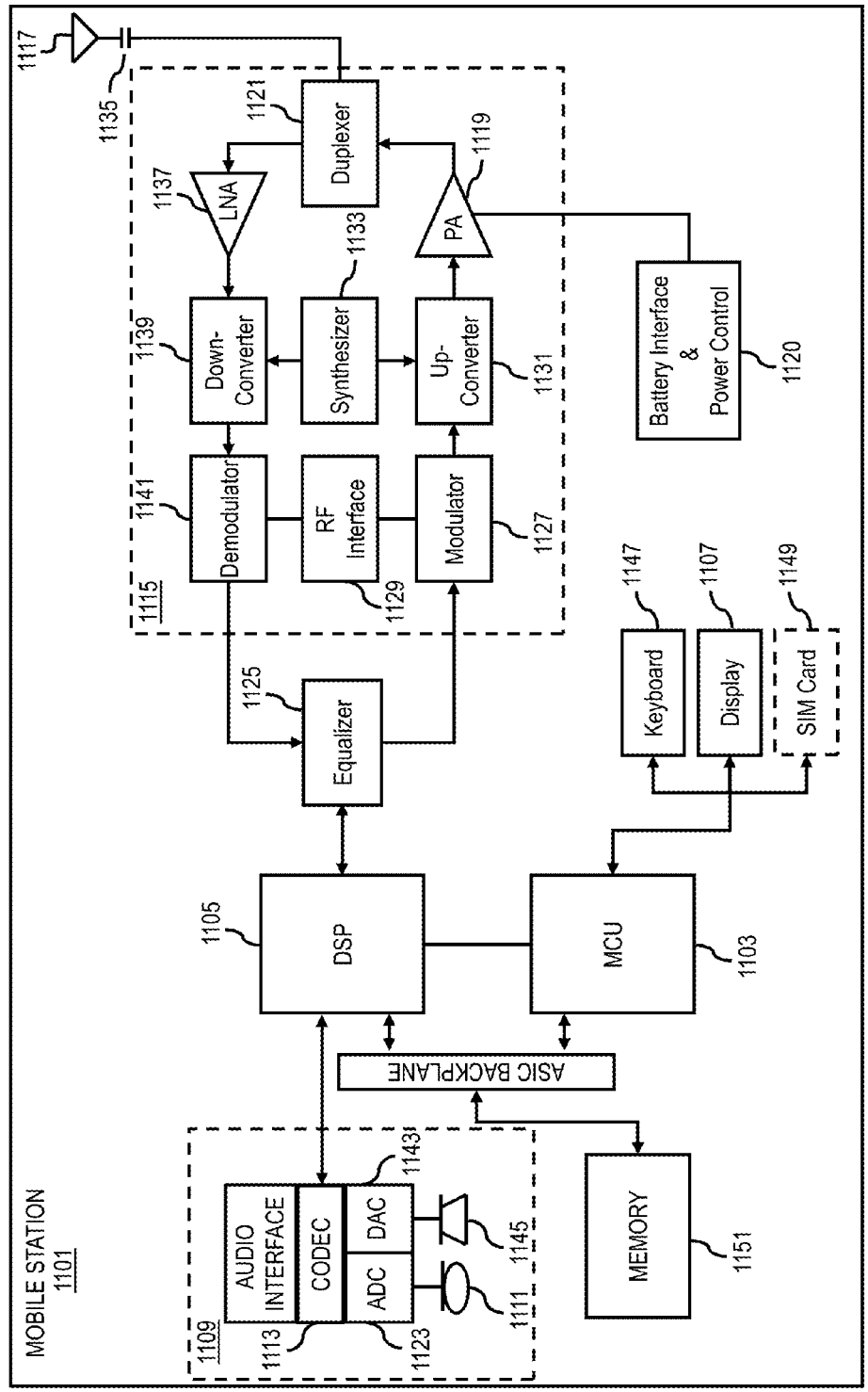
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of providing optimized privacy in cognitive radio information sharing. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a base-band integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of providing optimized privacy in cognitive radio information sharing. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna

1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to provide optimized privacy in cognitive radio information sharing. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving cognitive radio connectivity information from at least one device;
   determining one or more parameters that inversely affect cognitive radio connectivity of the at least one device, wherein the one or more parameters include a privacy level parameter;
   processing the cognitive radio connectivity information to determine a service quality and an amount of the cognitive radio connectivity; and
   determining at least one service class for providing the cognitive radio connectivity to the at least one device based, at least in part, on an extent to which the service quality and the amount of the cognitive radio connectivity are inversely affected by the privacy level parameter.

2. A method of claim 1, further comprising:
   determining a detail level of the cognitive radio connectivity information to be shared with a network operator, a service provider, or a combination thereof, based on the at least one service class, the extent, and a value of the privacy level parameter, wherein the at least one service class relates to one or more privacy aspects.

3. A method of claim 2, further comprising:

providing the cognitive radio connectivity to the at least one device based the at least one service class; and updating the cognitive radio connectivity to the at least one device based another service class, in response to one or more changes to the predetermined value of the privacy level parameter, wherein the value of the privacy level parameter is based, at least in part, on an ownership of the cognitive radio connectivity information, a provenance of the cognitive radio connectivity information, a sensitivity of the cognitive radio connectivity information, one or more usage rights of the cognitive radio connectivity information, one or more entities with access to at least a portion of cognitive radio connectivity information, a retention of the cognitive radio connectivity information, or a combination thereof.

4. A method of claim 1, further comprising:

determining resource information, security information, or a combination thereof associated with the at least one device, a user of the at least one device, or a combination thereof, wherein the at least one service class is further based, at least in part, on the resource information, security information, or a combination thereof.

5. A method of claim 1, further comprising:

determining one or more costs functions relating, at least in part, to one or more privacy levels, one or more accuracy levels, or a combination thereof of the cognitive radio connectivity information, wherein the at least one service class is further based, at least in part, on the one or more cost functions.

6. A method of claim 1, wherein the cognitive radio connectivity is available from a plurality of user device communities, and wherein the method further comprising:

determining that the at least one service class is provided by a first one of the plurality of user device communities; and mapping the at least one service class to at least one other service class provided by at least one other of the plurality of user device communities.

7. A method of claim 6, further comprising:

joining the at least one device to at least one of the plurality of user device communities based, at least in part, on respective service classes provided by the plurality of user device communities.

8. A method of claim 1, further comprising:

transmitting a request for the cognitive radio connectivity, the request specifying one or more operations;

determining a recommended service class based, at least in part, on the one or more operations; and determining one or more information sharing recommendations to achieve the recommended service class.

9. A method of claim 1, wherein the cognitive radio connectivity information includes, at least in part, location information, identity information, connectivity subscription information, group membership information, incentive program participation information, information on one or more applications using the cognitive radio connectivity, or a combination thereof, associated with the at least one device, a user of the at least one device, or a combination thereof.

10. An apparatus comprising:

at least one processor; and at least one memory including computer program code for one or more programs, the at least one memory and the computer program code configured to, with the at least one processor, cause the apparatus to perform at least the following, receive cognitive radio connectivity information from at least one device;

determine one or more parameters that inversely affect cognitive radio connectivity of the at least one device, wherein the one or more parameters include a privacy level parameter;

process the cognitive radio connectivity information to determine a service quality and an amount of the cognitive radio connectivity; and determine at least one service class for providing the cognitive radio connectivity to the at least one device based, at least in part, on an extent to which the service quality and the amount of the cognitive radio connectivity are inversely affected by the privacy level parameter.

11. An apparatus of claim 10, wherein the at least one service class relates to one or more privacy aspects.

12. An apparatus of claim 11, wherein the one or more privacy aspects include, at least in part, an ownership of the cognitive radio connectivity information, a provenance of the cognitive radio connectivity information, a sensitivity of the cognitive radio connectivity information, one or more usage rights of the cognitive radio connectivity information, one or more entities with access to at least a portion of cognitive radio connectivity information, a retention of the cognitive radio connectivity information, or a combination thereof.

13. An apparatus of claim 10, wherein the apparatus is further caused to:

determine resource information, security information, or a combination thereof associated with the at least one device, a user of the at least one device, or a combination thereof, wherein the at least one service class is further based, at least in part, on the resource information, security information, or a combination thereof.

14. An apparatus of claim 10, wherein the apparatus is further caused to:

determine one or more costs functions relating, at least in part, to one or more privacy levels, one or more accuracy levels, or a combination thereof of the cognitive radio connectivity information, wherein the at least one service class is further based, at least in part, on the one or more cost functions.

15. An apparatus of claim 10, wherein the cognitive radio connectivity is available from a plurality of user device communities, and wherein the apparatus is further caused to:

determine that the at least one service class is provided by a first one of the plurality of user device communities; and map the at least one service class to at least one other service class provided by at least one other of the plurality of user device communities.

16. An apparatus of claim 15, wherein the apparatus is further caused to:

join the at least one device to at least one of the plurality of user device communities based, at least in part, on respective service classes provided by the plurality of user device communities.

17. An apparatus of claim 10, wherein the apparatus is further caused to:

request the cognitive radio connectivity, the request specifying one or more operations;

determine a recommended service class based, at least in part, on the one or more operations; and determine one or more information sharing recommendations to achieve the recommended service class.

18. An apparatus of claim 10, wherein the cognitive radio connectivity information includes, at least in part, location information, identity information, connectivity subscription information, group membership information, incentive program participation information, information on one or more applications using the cognitive radio connectivity, or a combination thereof, associated with the at least one device, a user of the at least one device, or a combination thereof.

* * * * *